(12) United States Patent
Minoura et al.

(10) Patent No.: US 6,819,507 B2
(45) Date of Patent: Nov. 16, 2004

(54) OPTICAL ELEMENT LIKE CORNER CUBE RETROREFLECTOR AND REFLECTIVE DISPLAY DEVICE INCLUDING SUCH AN OPTICAL ELEMENT

(75) Inventors: Kiyoshi Minoura, Tenri (JP); Shun Ueki, Nara (JP); Masahiko Tomikawa, Funabashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/077,749

(22) Filed: Feb. 20, 2002

(65) Prior Publication Data

US 2002/0154408 A1 Oct. 24, 2002

(30) Foreign Application Priority Data

Feb. 20, 2001 (JP) .......................................... 2001-044195
Sep. 26, 2001 (JP) .......................................... 2001-294526

(51) Int. Cl.[7] ............................................. G02B 17/00
(52) U.S. Cl. ........................ 359/727; 359/730; 359/529
(58) Field of Search ................................. 359/729, 730, 359/524, 530; 345/7; 349/86, 95, 160, 113, 84

(56) References Cited

U.S. PATENT DOCUMENTS

| | | | |
|---|---|---|---|
| 3,905,682 A | 9/1975 | Meyerhofer | |
| 4,066,331 A | 1/1978 | Lindner | |
| 4,526,439 A | * 7/1985 | Okoshi et al. | ............... 359/458 |
| 4,703,999 A | * 11/1987 | Benson | ....................... 359/532 |
| 5,132,823 A | 7/1992 | Kamath et al. | |
| 5,182,663 A | 1/1993 | Jones | |
| 2001/0040717 A1 | 11/2001 | Minoura et al. | |

FOREIGN PATENT DOCUMENTS

| | | |
|---|---|---|
| JP | 54-105998 A | 8/1979 |
| JP | 3-186816 A | 8/1991 |
| JP | 11-007008 | 1/1999 |
| JP | 2000-019490 | 1/2000 |
| JP | 2000-221497 | 8/2000 |
| WO | 98/57212 | 12/1998 |

* cited by examiner

*Primary Examiner*—Drew A. Dunn
*Assistant Examiner*—Joshua L Pritchett
(74) *Attorney, Agent, or Firm*—Nixon & Vanderhye P.C.

(57) ABSTRACT

An optical element includes first and second members. The first member has a first surface including a first concave portion. The second member has a second surface including a second concave portion and transmits incoming light therethrough. The first and second members are disposed so that the first and second surfaces are opposed to each other. First and second reflective regions have been formed on the first and second concave portions, respectively. At least part of the incoming light that has been transmitted through the second member is reflected from at least one of the first and second reflective regions.

25 Claims, 22 Drawing Sheets

○ HIGHEST POINT
● LOWEST POINT
× INTERMEDIATE POINT

○ CONVEX POINT
● CONCAVE POINT (a)

(b)

(e1)

(e2)

(h)

(a)

(b1)  (b2)

(b1')  (b2')

(c1)  (c2)

(d1)

(d2)

(d1')

(d2')

(e2)

(f)

(g)

(g')

OPTICAL ELEMENT LIKE CORNER CUBE RETROREFLECTOR AND REFLECTIVE DISPLAY DEVICE INCLUDING SUCH AN OPTICAL ELEMENT

BACKGROUND OF THE INVENTION

1. Field of the Invention

The present invention relates to an optical element having a reflective function and to a reflective display device including such an optical element.

2. Description of the Related Art

In recent years, a micro lens having an extremely small lens diameter and an array of such micro lenses have been developed and more and more extensively applied to the fields of optical communications and display devices. Along with those micro lenses and micro lens arrays, various other micro optical elements, including micro mirrors and micro prisms, have also been developed day after day. And it is expected that the optical technology and display technology will be further developed and advanced by realizing those micro optical elements.

A reflective liquid crystal display device, including a retroreflector as such a micro optical element, is disclosed in Japanese Laid-Open Publication Nos. 11-7008 and 2000-19490, for example. Using a retroreflector, an incoming light ray may be retro-reflected, or reflected along a path parallel to that of the incoming light ray. Accordingly, in the reflective liquid crystal display device, reflected part of light that has been emitted from a light source located near the user selectively reaches the user's eyes but reflected part of other external light sources (e.g., illuminator or sun) does not reach his or her eyes. In this manner, unwanted back reflection (i.e., glare) is minimizable and the visibility is improvable. Also, since the reflective liquid crystal display device reduces the unwanted back reflection by using such a retroreflector, there is no need to reduce the intensity of the reflected light by intentionally decreasing the reflectance of the reflector, for example. As a result, display of a bright, high-contrast image is realized.

A retroreflector for use in the reflective liquid crystal display device, for example, may be formed as a micro optical element such as a corner cube array. A corner cube typically has three perpendicularly opposed reflective planes. The corner cube is an optical element for reflecting an incoming light ray back to its source by getting the light ray reflected by each one of those reflective planes after another The corner cube can always reflect the incoming light back to its source irrespective of its angle of incidence Hereinafter, a conventional reflective liquid crystal display device 80, including a retroreflector that has been formed as a corner cube array, will be described with reference to FIG. 1.

The reflective liquid crystal display device 80 includes: a substrate 82 on which a corner cube array 83 has been formed; a transparent substrate 81 located closer to an observer; and a polymer-dispersed liquid crystal layer 84 interposed between these substrates 81 and 82. A metallic reflective film 85 has been formed on the corner cube array 83. When color black should be displayed, incoming light, which has been transmitted through the transparent substrate 81 and the polymer-dispersed liquid crystal layer 84 controlled to a light transmitting state, can be reflected back toward its origin. The concave portions of the corner cube array 83 are filled with a transparent flattening member 86, on which a transparent electrode 87 has been formed. A color filter layer 88 and another transparent electrode 89 are provided on the surface of the transparent substrate 81 that is opposed to the liquid crystal layer 84. By regulating the voltage applied between the transparent electrodes 87 and 89, the reflective liquid crystal display device 80 controls the light transmittance (or scattering state) of the polymer-dispersed liquid crystal layer 84, thereby displaying an image thereon.

The size L1 of each corner cube included in the display device 80 is preferably equal to or smaller than the size L2 of each pixel. Accordingly, if the pixel size L2 of a display device is about 100 $\mu$m, the corner cube size L1 is preferably several tens $\mu$m or less. For example, Japanese Laid-Open Publication No. 11-7008 describes that when an array of quadrangular pyramidal concave portions is formed, the upper square of each quadrangular pyramidal concave portion should have a minimum size of about 5 $\mu$m each side.

In the conventional reflective liquid crystal display devices, the retroreflector thereof often has triangular pyramidal, quadrangular pyramidal or spherical concave portions. However, there are only a limited number of optical element shapes that can be formed precisely enough at that small size of several tens $\mu$m or less. An optical element including only concave or convex portions is relatively easy to shape. As for a display device that is currently having its pixel size reduced as much as possible to realize a high resolution, a micro corner cube should be formed at a very small size and with sufficiently high shape precision. Nevertheless, it is difficult to form such a micro corner cube in a complex shape.

On the other hand, it is known that a retroreflector of a relatively large size for use in a road sign, for example, includes corner cubes of a more complex shape. Hereinafter, a corner cube of such a complex shape will be described with reference to FIGS. 2A through 2C.

As shown in FIGS. 2A through 2C, the corner cube 90 has a structure including three substantially square reflective planes S1, S2 and S3 that are opposed almost perpendicularly to each other. As shown in FIG. 2C, an incoming light ray, which has been incident onto the corner cube 90, is reflected by one of these three planes S2, S3 and S1 after another, for example, so as to be reflected back to the direction from which it comes. In the corner cube 90, the substantially square reflective planes S1, S2 and S3 correspond to three of the six planes of a cube, which share one vertex of the cube. As shown in FIG. 2A, the corner cube 90 is made up of convex portions 92, each having a highest point indicated by an open circle ○ (which is higher in level than intermediate points indicated by crosses X), and concave portions 94, each having a lowest point indicated by a solid circle ● (which is lower in level than the intermediate points indicated by the crosses X).

Such a corner cube 90 (which will be herein referred to as a "cubic corner cube") has a shape including both the convex portions 92 and concave portions 94. Accordingly, compared to an optical element including only concave or convex portions (e.g., triangular pyramidal portions) as disclosed in Japanese Laid-Open Publication No. 11-7008, for example, it is more difficult to make this cubic corner cube 90. Hereinafter, a conventional method of making the cubic corner cube array shown in FIGS. 2A through 2C will be described.

Pin Bundling Method

In a pin bundling method, the end of a hexagonal columnar metal pin is provided with a prism having three square facets that are opposed perpendicularly to each other, and a number of such pins are bundled together to make a collection of prisms. In this manner, a cubic corner cube is made up of three facets of three prisms that are formed at the respective ends of three adjacent pins.

According to this method, however, a corner cube array should be made by collecting a plurality of prisms that have been separately formed for mutually different pins. Thus, it is actually difficult to make a corner cube of a small size. The minimum possible size of a corner cube (as indicated by L3 in FIG. 2B) that can be formed by this method is 1 mm. That is to say, a cubic corner cube having a size of several tens µm is hard to make by this method.

Plate Method

In a plate method, a number of flat plates, each having two mutually parallel planes, are stacked one upon the other. At the side end face of these flat plates stacked, V-grooves are cut vertically to the parallel planes at an equal pitch, thereby forming a series of roof-shaped protrusions each having an apical angle of approximately 90 degrees. Next, each of these flat plates is horizontally shifted with respect to adjacent one of them so that the tops of the series of roof-shaped protrusions formed on the former plate are aligned with the bottoms of the V-grooves formed on the latter plate. In this manner, a die for use to make a cubic corner cube array is obtained.

According to this method, however, it is necessary to accurately shift and secure the flat plate having the roof-shaped protrusions with respect to the adjacent flat plate so that these two plates satisfy a required positional relationship. Thus, it is also difficult to make a cubic corner cube of as small a size as 100 µm or less by this method.

A corner cube array for use as a retroreflector for a reflective liquid crystal display device needs to have a size equal to or smaller than a pixel size. Thus, in the prior art, the corner cube array has been formed to include only triangular pyramidal concave or convex portions that are relatively easy to make. However, if such a corner cube array including only those triangular pyramidal concave or convex portions (which will be herein referred to as a "triangular pyramidal corner cube array" for convenience sake) is used, then the incoming light cannot be retro-reflected so efficiently as the cubic corner cube array. Hereinafter, it will be described with reference to FIGS. 3A through 3D how the incoming light is reflected by triangular pyramidal and cubic corner cubes.

FIGS. 3A and 3B illustrate a triangular pyramidal corner cube 96, while FIGS. 3C and 3D illustrate a cubic corner cube 98. As shown in FIG. 3B, a light ray A, which has been incident onto the center portion of the triangular pyramidal corner cube 96, is retro-reflected as indicated by the dashed line. But a light ray B, which has been incident onto an edge portion of the corner cube 96, is not retro-reflected. Accordingly, the triangular pyramidal corner cube 96 has non-retro-reflecting regions 96a at its three corner portions as shown in FIG. 3A. On the other hand, even the light ray B that has been incident onto an edge portion of the cubic corner cube 98 is also retro-reflected as shown in FIG. 3D. Thus, the cubic corner cube 98 has a broader retro-reflecting region on each reflective plane thereof and can appropriately retro-reflect a greater percentage of the incoming light.

The triangular pyramidal corner cube has non-retro-reflecting regions. Accordingly, if a retroreflector including those triangular pyramidal corner cubes is used for a reflective display device, part of the light that has been transmitted through the liquid crystal layer when color black should be displayed is sometimes not retro-reflected but reflected non-parallelly to the incoming light. Thus, part of the light that has been emitted from a distant, external light source may reach the user's eyes. As a result, the contrast ratio may be decreased.

A problem like this has not been regarded as a serious one where a retroreflector is used mainly to prevent the unwanted projection of external light. This is because even a retroreflector including triangular pyramidal corner cubes can retro-reflect the incoming light from most parts thereof and can achieve the object of preventing the regularly reflected part of the external light from reaching the user's eyes.

To minimize the decrease in contrast ratio for a reflective display device, the incoming light is preferably retro-reflected more efficiently by using a retroreflector including the cubic corner cubes. According to the conventional methods of making cubic corner cubes, however, it is possible to make cubic corner cubes of a relatively large size but it is virtually impossible to make cubic corner cubes of as small a size as 100 µm or less. Thus, it has been very hard to use a cubic corner cube array as a retroreflector for a liquid crystal display device.

Likewise, as for a micro optical element other than the cubic corner cube array, it has also been extremely difficult to make the optical element in a complex shape, at a very small size and with sufficiently high shape precision.

SUMMARY OF THE INVENTION

In order to overcome the problems described above, the present invention provides (1) an optical element that performs a desired function and yet can be formed at a very small size and (2) a reflective display device including such an optical element.

An optical element according to the present invention includes first and second members. The first member has a first surface including a first concave portion. The second member has a second surf ace including a second concave portion and transmits incoming light therethrough. The first and second members are disposed so that the first and second surfaces are opposed to each other. First and second reflective regions have been formed on the first and second concave portions, respectively. At least part of the incoming light that has been transmitted through the second member is reflected from at least one of the first and second reflective regions.

In one preferred embodiment of the present invention, the first surface includes the first concave portion and a flat portion, the second surface includes the second concave portion and a flat portion, and the first and second concave portions are so disposed as not to face each other.

In another preferred embodiment of the present invention, the first and second concave portions have substantially the same shape.

In still another preferred embodiment, each of the first and second concave portions has a triangular pyramidal shape, and the first and second concave portions constitute a part of a corner cube.

In this particular preferred embodiment, at least part of the incoming light that has been transmitted through the second member is reflected from both of the first and second reflective regions so that the incoming light is retro-reflected.

In yet another preferred embodiment, at least one of the first and second reflective regions is made of a metal film.

In yet another preferred embodiment, the second reflective region is made of a material that has a refractive index lower than that of the second member.

In this particular preferred embodiment, the optical element further includes a member for filling the first concave portion on the first reflective region. The first reflective region is made of a material that has a refractive index lower than that of the member for filling the first concave portion.

A reflective display device according to the present invention includes: the optical element according to any of the preferred embodiments of the present invention described above; and a light modulating layer interposed between the first and second members.

In one preferred embodiment of the present invention, the light modulating layer includes a scattering-type liquid crystal layer.

In this particular preferred embodiment, the reflective display device may further include: a first flattening member that fills the first concave portion of the first member; and a second flattening member that fills the second concave portion of the second member. The scattering-type liquid crystal layer is interposed between the surface of the first member that has been flattened by the first flattening member and the surface of the second member that has been flattened by the second flattening member.

In another preferred embodiment of the present invention, the scattering-type liquid crystal layer fills the first concave portion of the first member.

Another reflective display device according to the present invention includes: the optical element according to any of the preferred embodiments of the present invention described above; a transparent substrate disposed to face the optical element; and a light modulating layer, which is interposed between the optical element and the transparent substrate and controlled to assume either a light scattering state or a light transmitting state.

The present invention provides an array of corner cubes, each having three facets that are opposed substantially perpendicularly to each other. Each of the three facets of each said corner cube includes: a first surface of a concave portion that has been formed in a member; and a second surface of a convex member that has been formed on the member so as to be adjacent to the concave portion.

In one preferred embodiment of the present invention, the member includes the concave portion and a flat portion adjacent to the concave portion, and the convex member has been secured onto the flat portion.

In another preferred embodiment of the present invention, the first surface of the concave portion and the second surface of the convex member each have a planar shape of a rectangular isosceles triangle, and each of the three facets of each said corner cube is substantially square.

An inventive method of making an optical element includes the steps of: forming a first concave portion in a first member and forming a first reflective region on the first concave portion; forming a second concave portion in a second member and forming a second reflective region on the second concave portion; and disposing the first and second members in such a manner that a surface of the first member in which the first concave portion has been formed is opposed to a surface of the second member in which the second concave portion has been formed.

An inventive method of making a corner cube array includes the step of a) preparing a first member in which at least one first concave portion has been formed in a triangular pyramidal shape. The first concave portion is made up of three triangular facets that are opposed substantially perpendicularly to each other. The method further includes the step of b) preparing a second member in which at least one second concave portion has been formed in the triangular pyramidal shape. The second concave portion is made up of three triangular facets that are opposed substantially perpendicularly to each other. The method further includes the step of c) disposing the first and second members in such a manner that a surface of the first member in which the first concave portion has been formed is opposed to a surface of the second member in which the second concave portion has been formed. The corner cube array is made up of a plurality of cubic corner cubes, each of which includes a first set of triangular planes defined by the first concave portion and a second set of triangular planes defined by the second concave portion.

In one preferred embodiment of the present invention, the method further includes the steps of: forming a reflective region on each of the three triangular facets of the first concave portion; and forming a reflective region on each of the three triangular facets of the second concave portion. The second member is transparent. The reflective regions provided for the first concave portion and the reflective regions provided for the second concave portion are arranged substantially continuously to each other so that when the reflective regions provided for the first concave portion are used as concave reflective regions, the reflective regions provided for the second concave portion are used as convex reflective regions.

In another preferred embodiment of the present invention, the method further includes the steps of: filling the triangular pyramidal first concave portion of the first member with a convex member having a triangular pyramidal shape corresponding to that of the first concave portion before the step c) is performed; and securing the convex member in the triangular pyramidal shape onto on the second member after the step c) has been performed.

Another inventive method of making a corner cube array includes the steps of: a) preparing a member including a plurality of triangular pyramidal concave portions, each of which has three perpendicularly opposed equilateral triangular facets, in a predetermined surface thereof; and b) forming a plurality of triangular pyramidal convex members, each of which has three perpendicularly opposed equilateral triangular facets, on the predetermined surface of the member.

In one preferred embodiment of the present invention, the step b) includes the steps of: disposing a retaining member on the predetermined surface of the member to retain the convex members thereon; and transferring the convex members from the retaining member onto the predetermined surface of the member.

Still another inventive method of making a corner cube array includes the steps of: a) preparing a member including a plurality of triangular pyramidal concave portions, each of which has three perpendicularly opposed equilateral triangular facets; and b) forming a plurality of triangular pyramidal convex members, each of which has three perpendicularly opposed equilateral triangular facets, on a predetermined surface of the member.

In one preferred embodiment of the present invention, the step b) includes the steps of: disposing a retaining member on the predetermined surface of the member to retain the convex members thereon; and leaving the convex members on the predetermined surface of the member by dissolving the retaining member.

In another preferred embodiment, the step a) includes the steps of: forming grooves in three directions of a base material; transferring unevenness of the base material, in which the grooves have been formed, to a transfer material; and filling every other one of concave portions that have been formed in the transfer material.

In still another preferred embodiment, the step a) includes the step of anisotropically etching {111} planes of a cubic single crystalline substrate.

In yet another preferred embodiment, the step a) includes the step of pressing a pin, which has a triangular pyramidal convex member made up of three perpendicularly opposed equilateral triangular facets, onto a base material.

A die according to the present invention is used to make a micro corner cube array includes a base member including a plurality of triangular pyramidal concave portions, each of which has three perpendicularly opposed equilateral triangular facets, in a predetermined surface thereof; and a plurality of triangular pyramidal convex members, each of which has three perpendicularly opposed equilateral triangular facets, formed on the predetermined surface of the base member.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 14A illustrates two substrates that have been bonded together;

FIG. 14B illustrates one of the two substrates; and

FIG. 14C illustrates the other substrate.

FIG. 15A illustrates the two substrates bonded together;

FIG. 15B illustrates one of the two substrates; and

FIG. 15C illustrates the other substrate.

FIG. 16A illustrates two substrates that have been bonded together;

FIG. 16B illustrates one of the two substrates; and

FIG. 16C illustrates the other substrate.

FIG. 17A illustrates the two substrates bonded together;

FIG. 17B illustrates one of the two substrates; and

FIG. 17C illustrates the other substrate.

DETAILED DESCRIPTION OF PREFERRED EMBODIMENTS

Figure 1:
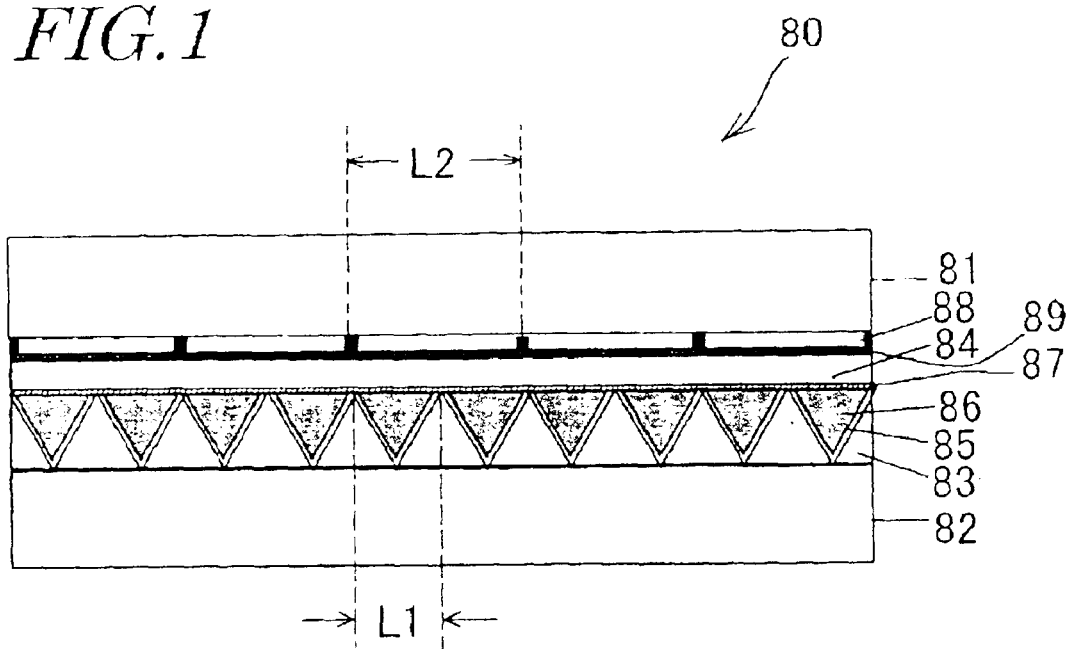
FIG. 1 is a cross-sectional view illustrating a configuration for a conventional reflective liquid crystal display device.
Figure 2A:
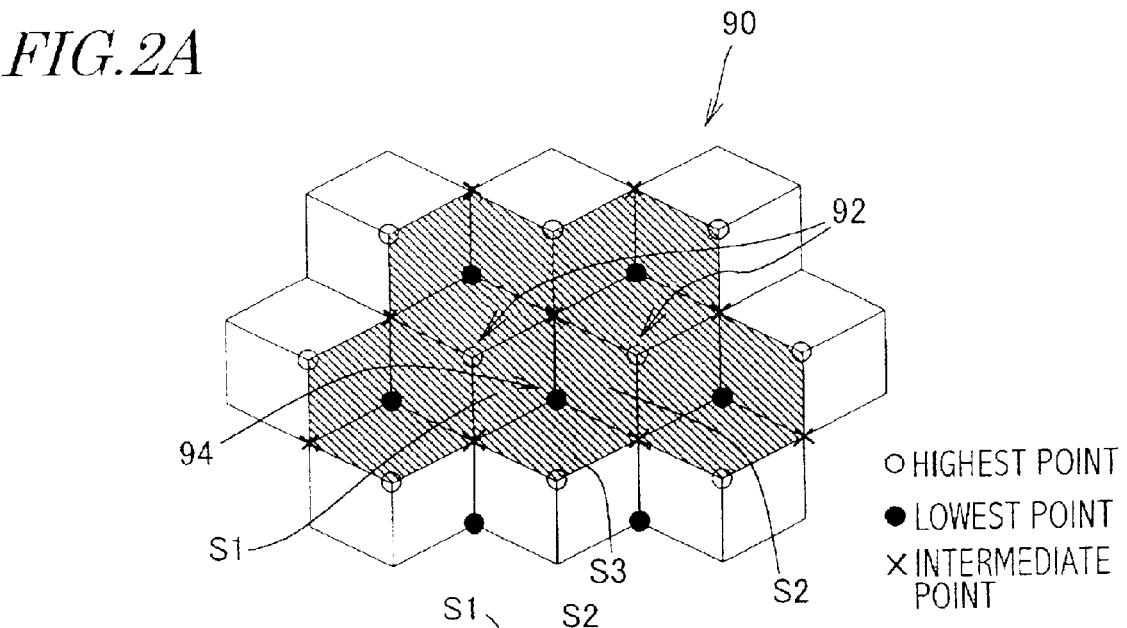
FIG. 2A is a plan view illustrating a cubic corner cube array.
Figure 2B:
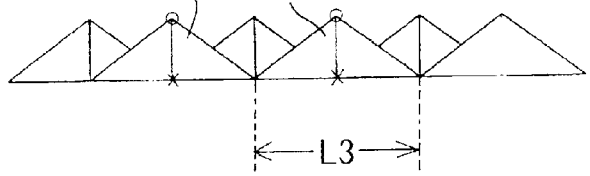
FIG. 2B is a side view illustrating a part of the array, which is higher in level than intermediate points.
Figure 2C:
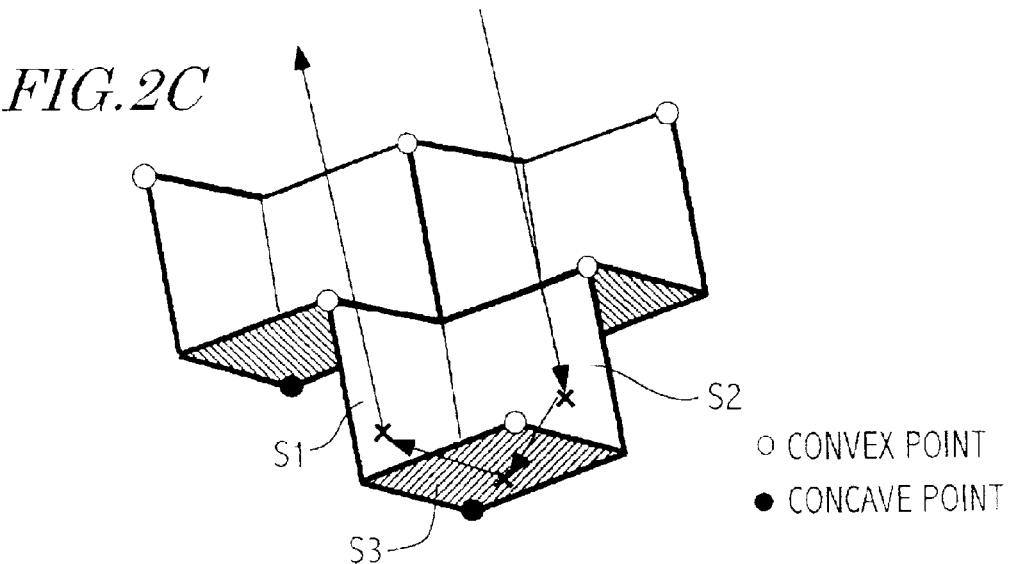
FIG. 2C is a perspective view illustrating another part of the array.
Figure 3A:
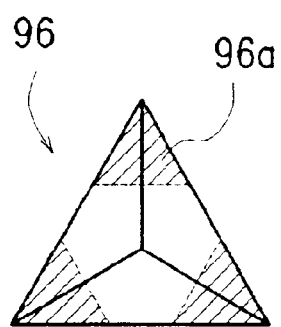
FIGS. 3A and 3B are respectively plan view and perspective view illustrating a triangular pyramidal corner cube.
Figure 3B:
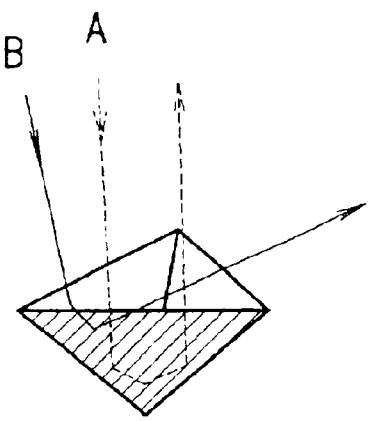
Figure 3C:
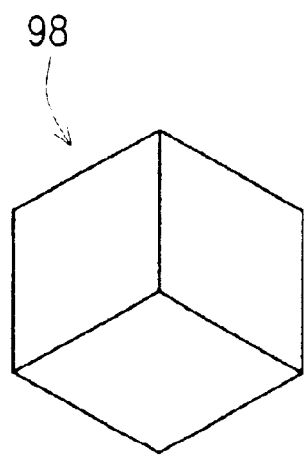
FIGS. 3C and 3D are respectively plan view and perspective view illustrating a cubic corner cube.
Figure 3D:
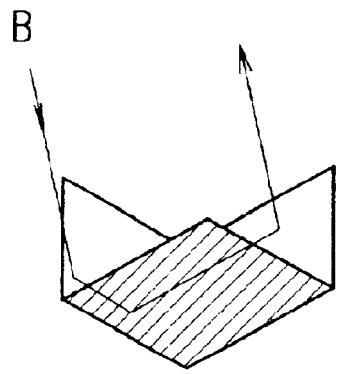

Hereinafter, preferred embodiments of the present invention will be described with reference to the accompanying drawings, in which members having substantially the same function will be identified by the same reference numeral.

Embodiment 1

A first specific preferred embodiment of the present invention relates to a retroreflector implemented as an array of cubic corner cubes of a very small size.

Figure 4A:
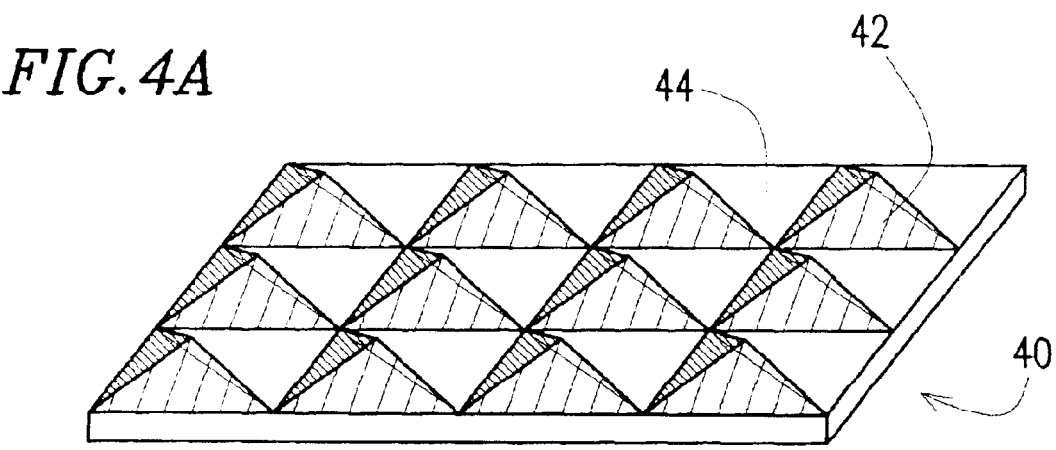
FIGS. 4A and 4B are respectively perspective view and plan view illustrating a die for use to make a retroreflector according to a first specific preferred embodiment of the present invention.
Figure 4B:
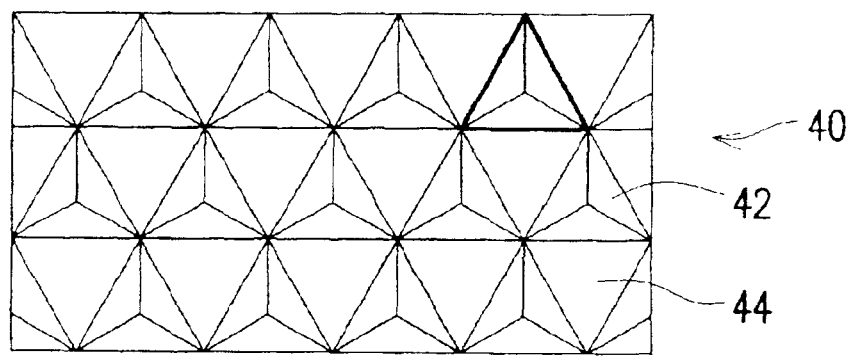

FIGS. 4A and 4B illustrate a die 40 for use to make the retroreflector of this preferred embodiment. This die 40 may be formed in the following manner. First, a high-hardness pin having a triangular pyramidal convex portion with three orthogonal faces is prepared by a cutting process. Next, this pin is pressed against a metal plate numerous times at a predetermined pitch. Then, the metal plate is subjected to an electroforming process to fabricate the die 40 in which the concave and convex portions are inverted to each other. As shown in FIGS. 4A and 4B, a number of triangular pyramidal convex portions 42 of a very small size and flat portions 44 are alternately arranged on the surface of the die 40. In this preferred embodiment, the bottom of the triangular pyramids has a size of about 50 $\mu$m each side, for example. Also, each of these triangular pyramidal convex portions 42 preferably has three perpendicularly opposed facets.

Figure 5A:
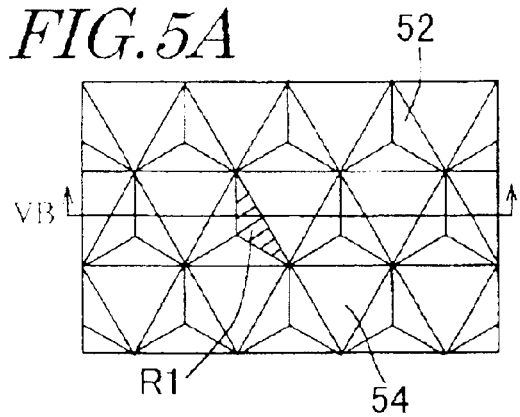
FIG. 5A is a plan view illustrating the upper half of the retroreflector of the first embodiment.
Figure 5C:
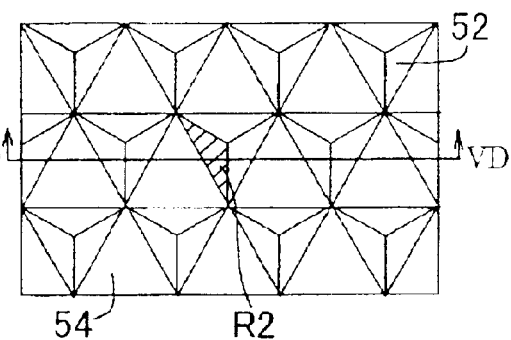
FIG. 5C is a plan view illustrating the lower half of the retroreflector of the first embodiment.
Figure 5B:
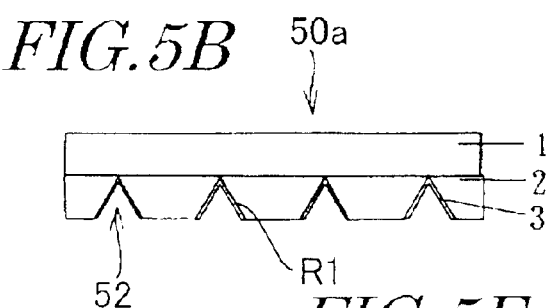
FIG. 5B is a cross-sectional view thereof taken along the line Vb—Vb shown in FIG. 5A.
Figure 5D:
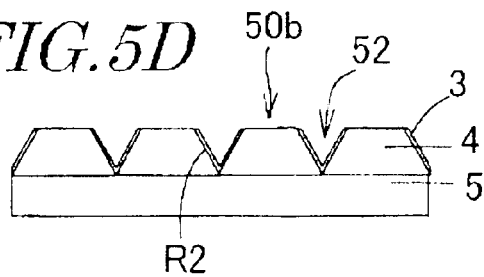
FIG. 5D is a cross-sectional view thereof taken along the line Vd—Vd shown in FIG. 5C.
Figure 5E:
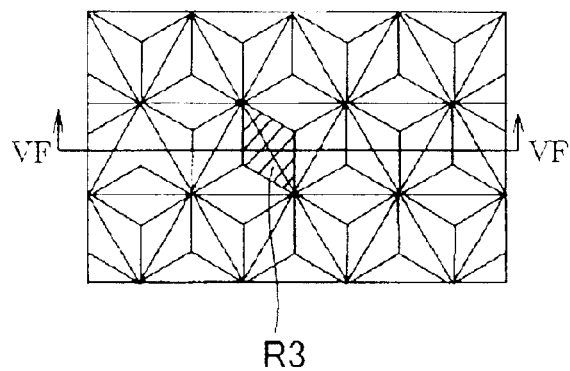
FIG. 5E is a plan view illustrating the retroreflector of the first embodiment, of which the upper and lower halves have been stacked one upon the other.
Figure 5F:
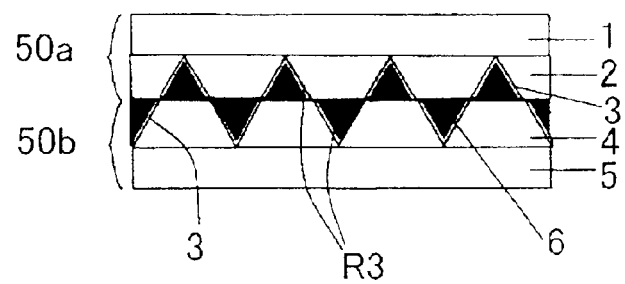
FIG. 5F is a cross-sectional view thereof taken along the line Vf—Vf shown in FIG. 5E.

FIGS. 5A through 5F illustrate a retroreflector 50 made by using the die 40 shown in FIGS. 4A and 4B. In this preferred embodiment, the retroreflector 50 is formed by bonding the upper half 50a shown in FIGS. 5A and 5B and the lower half 50b shown in FIGS. 5C and 5D together as shown in FIGS. 5E and 5F. Hereinafter, the configuration of this retroreflector 50 will be described.

As shown in FIGS. 5A and 5B, the upper half 50a includes a transparent substrate 1 of glass, for example, and a transparent resin layer 2 that has been formed on one surface of the transparent substrate 1. An array of triangular pyramidal concave portions 52 of a very small size has been formed in the surface of the transparent resin layer 2. In any direction in which the triangular pyramidal concave portions 52 are arranged, the triangular pyramidal concave portions 52 are alternated with flat portions 54 on the surface of the transparent resin layer 2.

The transparent resin layer 2 having those triangular pyramidal concave portions 52 is formed by coating the surface of the transparent substrate 1 with a UV-curable transparent resin material, embossing the transparent resin with the die 40 shown in FIGS. 4A and 4B and then exposing the transparent resin to a UV ray to cure it. As the transparent resin material, V300 (with a refractive index of 1.52) produced by Adell Corporation may be used. The transparent resin may be cured at an exposure temperature of 50° C. and at a UV radiation exposure dose of 50 mW/cm²×60 seconds.

Next, the flat portions 54 of the transparent resin layer 2 formed in this manner are masked to form a metallic reflective film 3 only on the triangular pyramidal concave portions 52. The metallic reflective film 3 may be formed by depositing an aluminum film to a thickness of 100 nm using an evaporation apparatus, for example. The metallic reflective film 3 may also be made of silver or any other suitable metal. It should be noted that this reflective film preferably has a surface roughness small enough to mirror-reflect the incoming light.

The lower half 50b also has a similar structure in which a resin layer 4, including an array of triangular pyramidal concave portions 52, has been formed on one surface of a substrate 5. Thus, the lower half 50b may also be formed by the same method as that used to make the upper half 50a. In this preferred embodiment, the triangular pyramidal concave portions 52 formed in the upper half 50a have substantially the same shape as the counterparts formed in the lower half 50b. However, unlike the substrate 1 and resin layer 2 of the upper half 50a, the substrate 5 and resin layer 4 of the lower half 50b do not have to be transparent. In the retroreflector 50, only the member on which the light to be retro-reflected should be incident (i.e., the upper half 50a in the example illustrated in FIGS. 5A through 5F) needs to be transparent.

The metallic reflective film 3 is also formed on the triangular pyramidal concave portions 52 in the resin layer 4 of the lower half 50b. The metallic reflective film 3 for the lower half 50b may also be formed by the same method as that used to form the metallic reflective film 3 for the upper half 50a. As for the lower half 50b, so long as the triangular pyramidal concave portions 52 of the resin layer 4 are covered with the metallic reflective film 3, the flat portions 54 of the resin layer 4 may or may not be covered with the metallic reflective film 3.

Next, the concave portions 52 of the upper and lower halves 50a and 50b, which have been covered with the reflective film 3, are filled with a transparent flattening member 6, thereby flattening the respective surfaces of the resin layers 2 and 4. This transparent flattening member 6 may be formed by coating the concave portions 52 with a UV-curable resin and then exposing the resin to a UV ray to cure it. This flattening member 6 may be made of the same material as that of the transparent resin layer 2.

Then, the upper and lower halves 50a and 50b prepared in this manner are bonded together in such a manner that the respective resin layers 2 and 4 thereof face each other as shown in FIGS. 5E and 5F. In this bonding process step, the upper and lower halves 50a and 50b are aligned with each other so that each of the concave portions 52 (or each part of the flattening member 6) of the upper half 50a faces the associated flat portion 54 of the lower half 50b and that each of the flat portions 54 of the upper half 50a faces the associated concave portion 52 (or the associated part of the flattening member 6) of the lower half 5ob. As a result, the respective concave portions 52 of the upper and lower halves 50a and 50b are so arranged as not to overlap with each other when the retroreflector 50 is looked down vertically to the surface of the transparent substrate 1. The upper and lower halves 50a and 50b may be bonded together by coating the surface of the upper half 50a with a UV-curable adhesive and by exposing the UV-curable adhesive to a UV ray while pressing the upper and lower halves 50a and 50b against each other with a UV press, for example. As the adhesive, Optokleb MO5 produced by Adell Corporation may be used. The upper and lower halves 50a and 50b may be bonded together at a pressure of 0.9 Kg/cm² and at a UV radiation exposure dose of 8 mW/cm²×600 seconds.

In this manner, the retroreflector 50 made up of the upper and lower halves 50a and 50b is obtained. In the retroreflector 50, a reflective region R1, provided for the upper half 50a as shown in FIGS. 5A and 5B, and a reflective region R2, provided for the lower half 50b so as not to face the reflective region R1 as shown in FIGS. 5C and 5D, together makes up a reflective region R3 of a cubic corner cube as shown in FIGS. 5E and 5F. Thus, according to this preferred embodiment, a reflective region provided for each concave portion of the upper half 50a is used as a reflective region for a convex portion of a cubic corner cube, while a reflective region provided for an associated concave portion of the lower half 50b is used as a reflective region for a concave portion of the cubic corner cube, thereby realizing a cubic corner cube of a complex shape as a combination of convex and concave portions.

The retroreflector 50 formed in this manner can reflect the incoming light, which has been transmitted through the transparent substrate 1 and the transparent resin layer 2, back to the direction from which it comes. To get the incoming light retro-reflected appropriately by the metallic reflective film 3, the reflection of the light from the boundary between the transparent resin layer 2 and the transparent flattening member 6 is preferably minimized. Such a boundary reflection is suppressible by selecting an appropriate combination of materials for the transparent resin layer 2 and the transparent flattening member 6. For example, if the ratio of the refractive index of the transparent flattening member 6 to that of the transparent resin layer 2 (i.e., the relative refractive index thereof) is set to a predetermined value or more, then the total reflection of the incoming light from the boundary can be prevented for a broad incidence angle range. Also, since the difference in refractive index between the transparent resin layer 2 and the transparent flattening member 6 should be as small as possible, the transparent resin layer 2 and the transparent flattening member 6 are preferably made of the same material.

The retroreflector 50 of this preferred embodiment can retro-reflect the incoming light more efficiently than the conventional retroreflector including triangular pyramidal corner cubes. In addition, the cubic corner cubes of the retroreflector 50 can be made at the same level of shape precision as, and at a size approximately twice as large as, the triangular pyramidal corner cubes. Accordingly, an array of cubic corner cubes of a very small size can be made highly precisely.

Embodiment 2

A second specific preferred embodiment of the present invention relates to a technique of making the retroreflector as an array of cubic corner cubes by a method different from that of the first preferred embodiment.

Figure 6A:
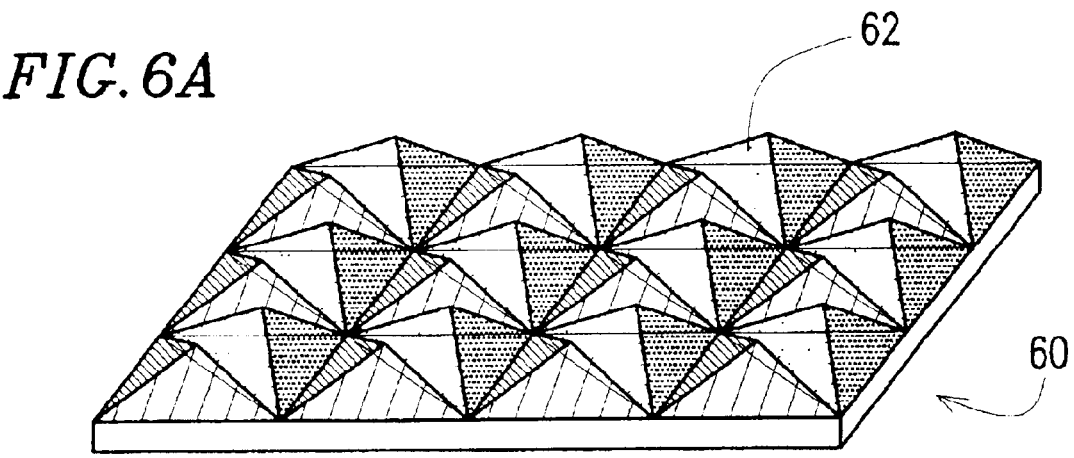
FIGS. 6A and 6B are respectively perspective view and plan view illustrating a die for use to make a retroreflector according to a second specific preferred embodiment of the present invention.
Figure 6B:
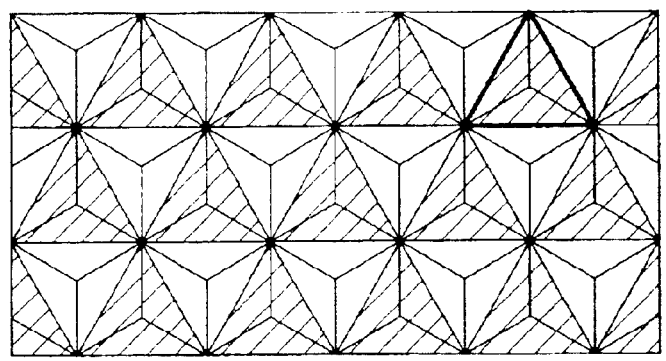

FIGS. 6A and 6B illustrate a die 60 for use to make the retroreflector of this preferred embodiment. As shown in FIGS. 6A and 6B, a number of triangular pyramidal convex portions 62 of a very small size are formed over the surface of the die 60. In this preferred embodiment, the bottom of the triangular pyramids has a size of about 50 μm each side, for example. Also, each of these triangular pyramidal convex portions 62 preferably has three perpendicularly opposed facets.

Figures 7A, 7B:
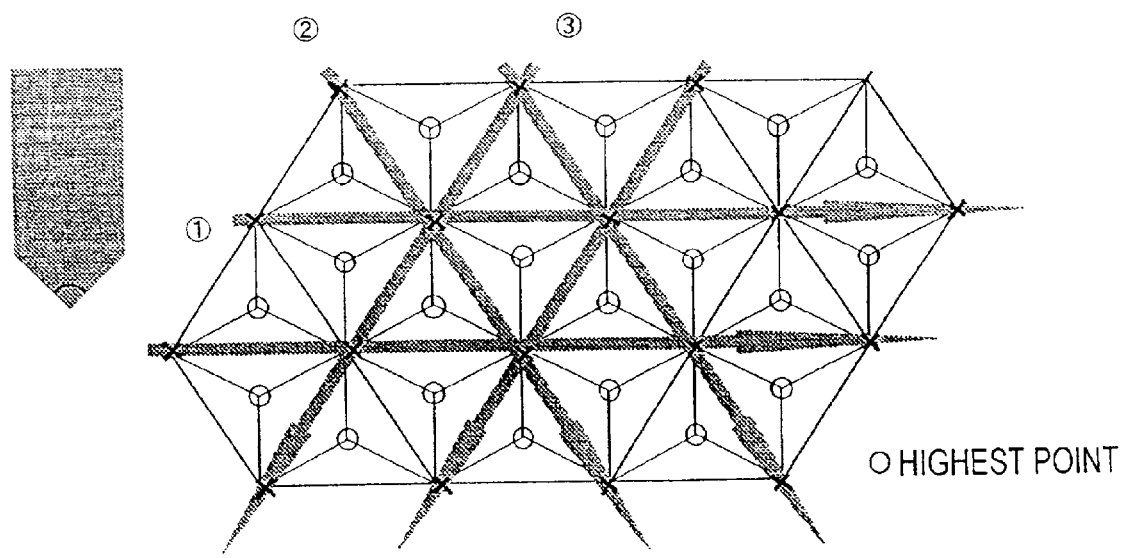
FIG. 7A is a plan view illustrating a cutting tool for use to make the die shown in FIGS. 6A and 6B.
FIG. 7B is a plan view illustrating how to make the die with the cutting tool shown in FIG. 7A.

A die 60 like this may be formed in the following manner. Specifically, as shown in FIG. 7B, multiple V-grooves are formed in three directions in the surface of a flat plate made of a metal or any other suitable material by using a cutting tool such as that shown in FIG. 7A. In this manner, a number of triangular pyramidal convex portions, each having a highest point indicated by an open circle ○ in FIG. 7B, are formed. According to this method, triangular pyramidal convex portions, whose bottom has a length of several tens μm each side, can be formed, and the die 60 shown in FIGS. 6A and 6B can be prepared.

Hereinafter, it will be described how to make a cubic corner cube array with such a die 60.

First, as in the first preferred embodiment, a pair of substrates, at least one of which is transparent, is prepared. Each of these substrates has one of its surfaces covered with a UV-curable transparent resin, which is embossed with the die 60 on which a number of triangular pyramids have been formed and then exposed to a UV ray and cured. On the resin layer that has been formed on the surface of one of these two substrates, a first group of triangular portions, which point to the same direction as indicated by hatching in FIG. 6B, are selectively masked. On the other hand, a second group of triangular portions, which point to the direction opposite to that of the first group of triangular portions as shown as non-hatched portions in FIG. 6B, are selectively covered with a metallic reflective film. On the resin layer that has been formed on the surface of the other substrate, the second group of triangular portions are selectively masked and the first group of triangular portions are selectively covered with a metallic reflective film. Next, as in the first embodiment, the concave portions, some of which have been covered with the metallic reflective films, are filled with a transparent resin material and flattened. And then these substrates are bonded together in such a manner that the first and second groups of triangular portions in the resin layer of one of these substrates are aligned with the first and second groups of triangular portions in the resin layer of the other substrate, respectively. In this manner, the same cubic corner cube array as that of the first embodiment can be obtained.

Embodiment 3

According to a third specific preferred embodiment of the present invention, the reflective regions are not made of the metallic reflective film 3 unlike the retroreflector 50 of the first embodiment but are formed by a different method.

Figure 8:
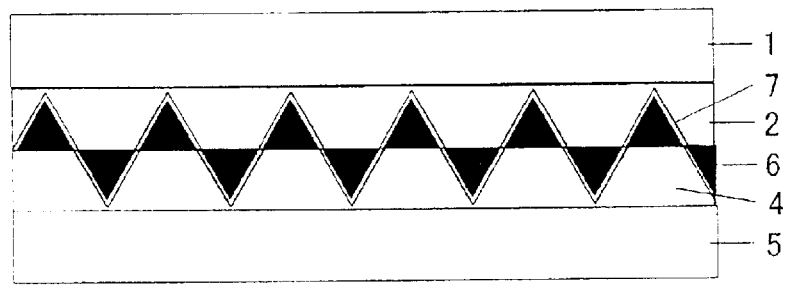
FIG. 8 is a cross-sectional view illustrating a configuration for a retroreflector according to a third specific preferred embodiment of the present invention.

FIG. 8 illustrates a cross-sectional structure of a retroreflector 64 according to the third preferred embodiment. In this preferred embodiment, each of the concave portions of the resin layers 2 and 4 on the substrates 1 and 5 is covered with a film 7 made of a material with a low refractive index to form a reflective region. In the other respects, the retroreflector 64 of the third embodiment is the same as the retroreflector 50 of the first embodiment.

Hereinafter, it will be described how to make the retroreflector 64. First, as in the first embodiment, the resin layers 2 and 4, each including a plurality of triangular pyramidal concave portions in the surface thereof, are formed on the substrates 1 and 5, respectively, by using the die 40 shown in FIGS. 4A and 4B. In this preferred embodiment, the transparent resin layers 2 and 4 are made of a visible radiation curable resin material (e.g., Optokleb HV16 produced by Adell Corporation) and cured by being exposed to visible radiation. These resin layers 2 and 4 have a refractive index $n_1$ of about 1.60.

Next, these resin layers 2 and 4 are coated with a resin material having a refractive index lower than that of the resin layers 2 and 4. The resin material is embossed with a die having triangular pyramidal convex portions thereon and then cured by being exposed to a UV ray. In this manner, the low-refractive-index material film 7 is formed. As the low-refractive-index material film 7, Opstar JM5010 produced by JSR Corp. may be used. The refractive index $n_2$ of this low-refractive-index material film 7 is about 1.41. The film 7 was cured at a UV radiation exposure dose of 30 mW/cm²×10 seconds.

The low-refractive-index material film 7 may also be made in a different manner. For example, the low-refractiveindex material film 7 may be made of an aerogel (e.g., silica aerogel), which is a porous material with a pore size sufficiently smaller than the wavelength of light. Normally, an aerogel is a material having extremely high transparency and a very low refractive index of about 1.1. Accordingly, an aerogel is a material suitably usable for the low-refractive-index material film 7 of this preferred embodiment. As another alternative, the low-refractive-index material film 7 may be replaced with an air layer. In that case, first, a gap in which the air layer should be formed is temporarily filled with a volatile liquid, for example. Next, the gap filled with the liquid is sealed with a resin or any other suitable material. Then, an air layer surrounded with the resin will be formed when the liquid vaporizes.

Thereafter, the concave portions, some of which have been coated with the low-refractive-index material film 7 in the resin layers 2 and 4, are further filled with the same resin material as that of the resin layers 2 and 4. Then, the resin material is exposed to, and cured by, visible radiation, thereby forming transparent flattening members 6. The refractive index of these transparent flattening members 6 is greater than that of the low-refractive-index material film 7. Next, the upper and lower halves prepared in this manner are bonded together by the same method as that already described for the first embodiment. In this manner, the retroreflector 64 including a cubic corner cube array is obtained.

Even if the metallic reflective film 3 of the first embodiment is replaced with the low-refractive-index material film 7 in this manner, the light that has been transmitted through the transparent substrate and the transparent resin layer still can be reflected back to its source. The refractive index of the low-refractive-index material film 7 is smaller than that of the transparent resin layer 2 or that of the transparent flattening member 6. Accordingly, any light that has been incident onto the boundary between the transparent resin layer 2 and the low-refractive-index material film 7 or the boundary between the transparent flattening member 6 and the low-refractive-index material film 7 at a predetermined incidence angle or more is totally reflected. As a result, a totally-reflecting-type micro corner cube array, exhibiting high optical efficiency without allowing the incident light to be absorbed into, or transmitted through, the reflective planes, can be obtained.

Embodiment 4

A fourth specific preferred embodiment of the present invention relates to a liquid crystal display device that uses the retroreflector 50 including the cubic corner cube array of the first embodiment.

Figure 9:
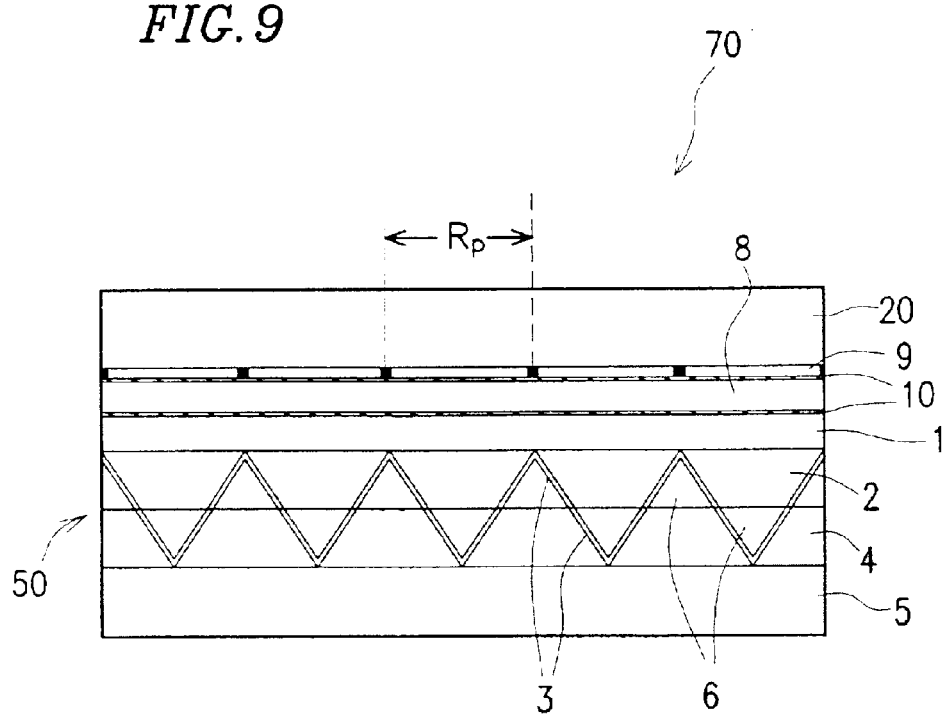
FIG. 9 is a cross-sectional view illustrating a configuration for a reflective liquid crystal display device according to a fourth specific preferred embodiment of the present invention.

FIG. 9 illustrates a reflective liquid crystal display device 70 according to this fourth preferred embodiment. As shown in FIG. 9, the reflective liquid crystal display device 70 includes: the retroreflector 50 of the first embodiment; a transparent substrate 20 disposed so as to face the retroreflector 50; and a scattering-type liquid crystal layer 8 interposed between the substrate 20 and the retroreflector 50.

On the surface of the transparent substrate 20 (made of glass, for example) that is opposed to the liquid crystal layer 8, a color filter layer 9 and a transparent electrode 10 have been formed. Another transparent electrode 10 is formed on the surface of the retroreflector 50 that is opposed to the liquid crystal layer 8. By applying a predetermined voltage to the scattering-type liquid crystal layer 8 by way of the opposed transparent electrodes 10, the reflective liquid crystal display device 70 having such a configuration can control the scattering-type liquid crystal layer 8 to either a light scattering state or a light transmitting state on a pixel region Rp basis. The scattering-type liquid crystal layer 8 may be made of polymer-dispersed liquid crystal material, nematic-cholesteric phase-change-type liquid crystal material or liquid crystal gel, for example.

If the retroreflector 50 is used as one of the two substrates to sandwich the liquid crystal layer between them, the reflective liquid crystal display device 70 of this preferred embodiment may be fabricated by a method similar to the conventional method of fabricating a reflective liquid crystal display device.

Hereinafter, it will be described how this reflective liquid crystal display device 70 conducts a display operation.

First, a white display mode thereof will be described. In the white display mode, the liquid crystal layer 8 is controlled to assume the scattering state. Accordingly, externally incident light is transmitted through the transparent substrate 20 and the color filter layer 9 and then scattered by the liquid crystal layer 8. In this case, the light that has been back-scattered by the liquid crystal layer 8 returns to the observer. Also, in the display device 70 of this preferred embodiment, most of the rectilinear light that has been transmitted through the liquid crystal layer 8 and most of the forward-scattered light are reflected from the reflective film 3 of the retroreflector 50 and passed through the liquid crystal layer 8 in the scattering state again so as to return to the observer. That is to say, not only the back-scattered light but also most of the other light return to the observer. Thus, the incoming light can be used highly efficiently and display of a bright image is realized.

Next, a black display mode thereof will be described. In the black display mode, the liquid crystal layer 8 is controlled to assume the transmitting state. Accordingly, the externally incident light, which has been transmitted through the transparent substrate 20 and the color filter layer 9, is transmitted through the liquid crystal layer 8. After having been transmitted through the liquid crystal layer 8, the light is retro-reflected from the reflective film 3 of the retroreflector 50 toward its original direction. Thus, the regularly reflected part of the externally incident light does not reach the observer's eyes. Instead, most of the light reaching his or her eyes is a reflected part of the light that has been emitted from the vicinity of his or her eyes. Also, in this retroreflector 50, each minimum unit structure of the corner cubes has a very small size, which is equal to or smaller than a pixel size (e.g., 100 $\mu$m). Accordingly, an image of the observer's black pupils is formed on his or her eyes. As a result, a good black display is realized.

In addition, the reflective display device 70 of this preferred embodiment uses the retroreflector 50 including the cubic corner cube array. Thus, compared to a situation where a reflector including a triangular pyramidal corner cube array is used, the display device 70 can retro-reflect the external light, which has been emitted from the vicinity of the observer, to its original direction much more efficiently. Accordingly, in the black display mode, the quantity of unwanted light that might reach the observer's eyes can be reduced. As a result, a high contrast ratio is realized.

Embodiment 5

A fifth specific preferred embodiment of the present invention relates to a liquid crystal display device implemented differently from the fourth embodiment.

Figure 10:
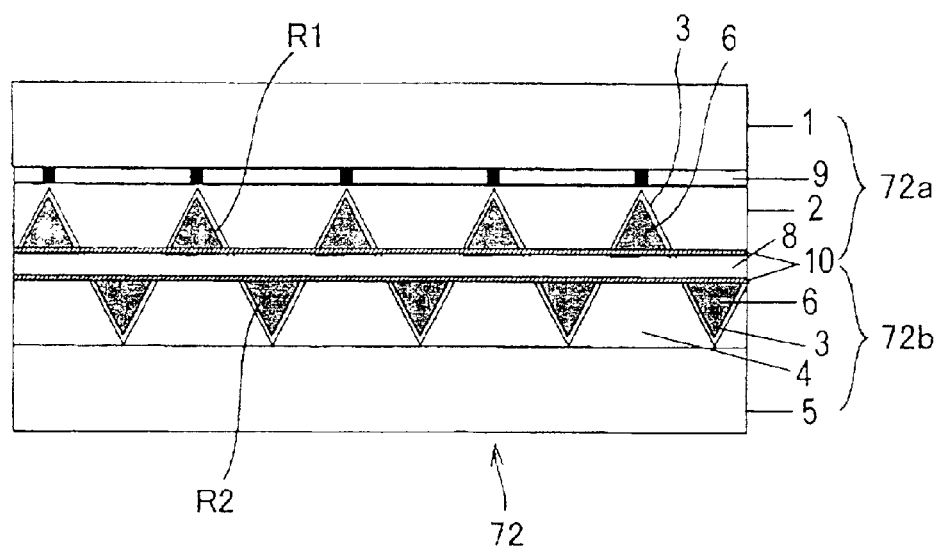
FIG. 10 is a cross-sectional view illustrating a configuration for a reflective liquid crystal display device according to a fifth specific preferred embodiment of the present invention.

FIG. 10 illustrates a reflective liquid crystal display device 72 according to the fifth preferred embodiment. The reflective liquid crystal display device 72 has a configuration in which the scattering-type liquid crystal layer 8 is interposed between an observer-side substrate 72a having a structure similar to that of the upper half 50a of the retroreflector 50 shown in FIG. 5F and a non-observer-side substrate 72b having a structure similar to that of the lower half 50b thereof. A transparent electrode 10 for applying a voltage to control the scattering (or transmitting) state of the scattering-type liquid crystal layer 8 is formed on the surface of the observer-side substrate 72a that is opposed to the liquid crystal layer 8. Another transparent electrode 10 is formed on the surface of the non-observer-side substrate 72b that is opposed to the liquid crystal layer 8. A color filter layer 9 is further provided for the observer-side substrate 72a between the transparent substrate 1 and the transparent resin layer 2.

Hereinafter, a method for fabricating the reflective liquid crystal display device 72 will be described. First, to make the observer-side substrate 72a, a color filter layer 9 is formed by a known technique on one of the surfaces of a transparent substrate 1 of glass, for example. Next, the surface of the color filter layer 9 is coated with a UV-curable transparent resin material, which is embossed with the die shown in FIGS. 4A and 4B and then exposed to, and cured by, a UV ray. In this manner, a transparent resin layer 2, having a surface including a plurality of triangular pyramidal concave portions, is formed. As the transparent resin material, SR35 produced by Nippon Kayaku Co., Ltd. was used. The resin material was cured at an exposure temperature of 50° C. and at a UV radiation exposure dose of 50 mW/cm²×60 seconds.

Subsequently, an aluminum film is deposited to a thickness of 100 nm over the entire surface of this transparent resin layer 2 by using an evaporation apparatus. Then, excessive parts of the aluminum film, which cover the flat portions other than the triangular pyramidal concave portions, are etched away using a mixture of nitric acid, phosphoric acid, acetic acid and water as an etchant. In this manner, a metallic reflective film 3 is selectively formed only on the triangular pyramidal concave portions. Next, the triangular pyramidal concave portions, which have been covered with the metallic reflective film 3, are filled with a UV-curable resin material to flatten them. Then, the UV-curable resin material is exposed to, and cured by, a UV ray, thereby forming a transparent flattening member 6. Thereafter, a conductor film of ITO (indium tin oxide) is formed on the flattened resin layer using a sputtering apparatus and then patterned into a desired shape to form a transparent electrode 10. In this manner, the observer-side substrate 72a is obtained.

On the other hand, to make the non-observer-side substrate 72b, a substrate 5 is coated with a resin material, which is embossed with a die having triangular pyramidal convex portions thereon and then exposed to, and cured by, a UV ray. In this manner, a resin layer 4 having a surface including a plurality of triangular pyramidal concave portions is formed. Thereafter, a metallic reflective film 3 and a transparent electrode 10 are formed in the same way as in the observer-side substrate 72a to obtain the non-observer-side substrate 72b.

Subsequently, the observer-side substrate 72a and the non-observer-side substrate 72b are bonded together with a gap of about 10 µm interposed between them so that the respective resin layers 2 and 4 face each other. In this case, these two substrates 72a and 72b are disposed so that the concave portions of the substrate 72a do not face the counterparts of the substrate 72b and that the reflective films 3 provided for these substrates 72a and 72b substantially form a cubic corner cube array. Then, a scattering-type liquid crystal material is injected into the gap between these substrates 72a and 72b bonded in this manner, thereby forming a scattering-type liquid crystal layer 8. It should be noted that the process steps of bonding the substrates and injecting the liquid crystal material may be carried out as in the conventional method for fabricating a liquid crystal display device. In this manner, the reflective liquid crystal display device 72 substantially including a cubic corner cube array is obtained.

As described above, in the reflective liquid crystal display device 72, the liquid crystal layer 8 is interposed between reflective regions R1 and R2 provided for the observer-side and non-observer-side substrates 72a and 72b, respectively. That is to say, these reflective regions R1 and R2 are not continuous with each other. However, if a normal that crosses the reflective region R1 at right angles is parallel to a normal that crosses the reflective region R2 at right angles, then externally incident light still can be retro-reflected appropriately. Accordingly, this pair of reflective regions R1 and R2 substantially functions as a single reflective plane of a cubic corner cube.

Hereinafter, a relationship between the size S1 or S2 of to a minimum unit structure of the corner cubes and the size S0 of a region (or dot) of a color filter representing R (red), G (green) or B (blue) for the reflective display device having such a configuration will be described with reference to FIGS. 11 and 12.

Figure 11:
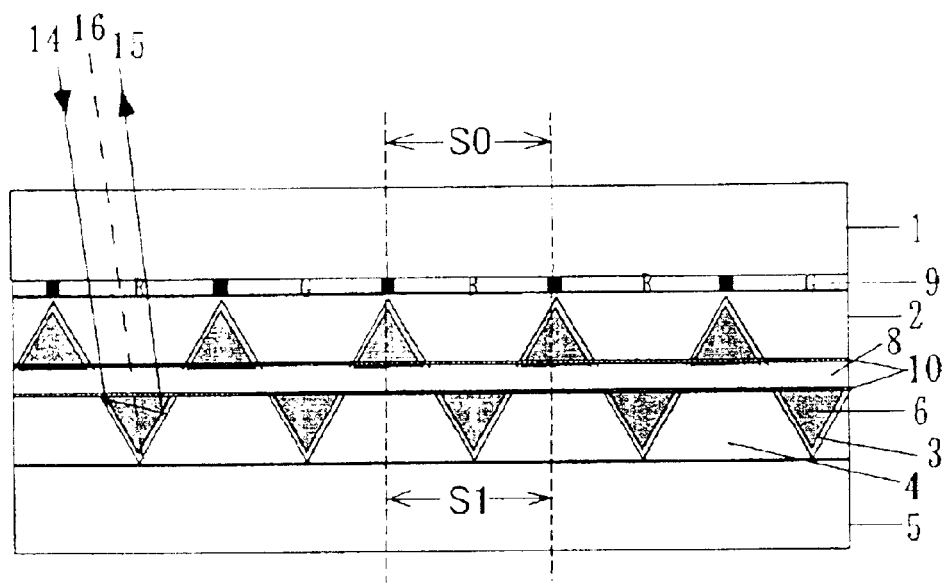
FIG. 11 is a cross-sectional view illustrating a situation where the size of a minimum unit structure of the corner cube array is set equal to or smaller than the dot size of color filters in the reflective liquid crystal display device shown in FIG. 10.
Figure 12:
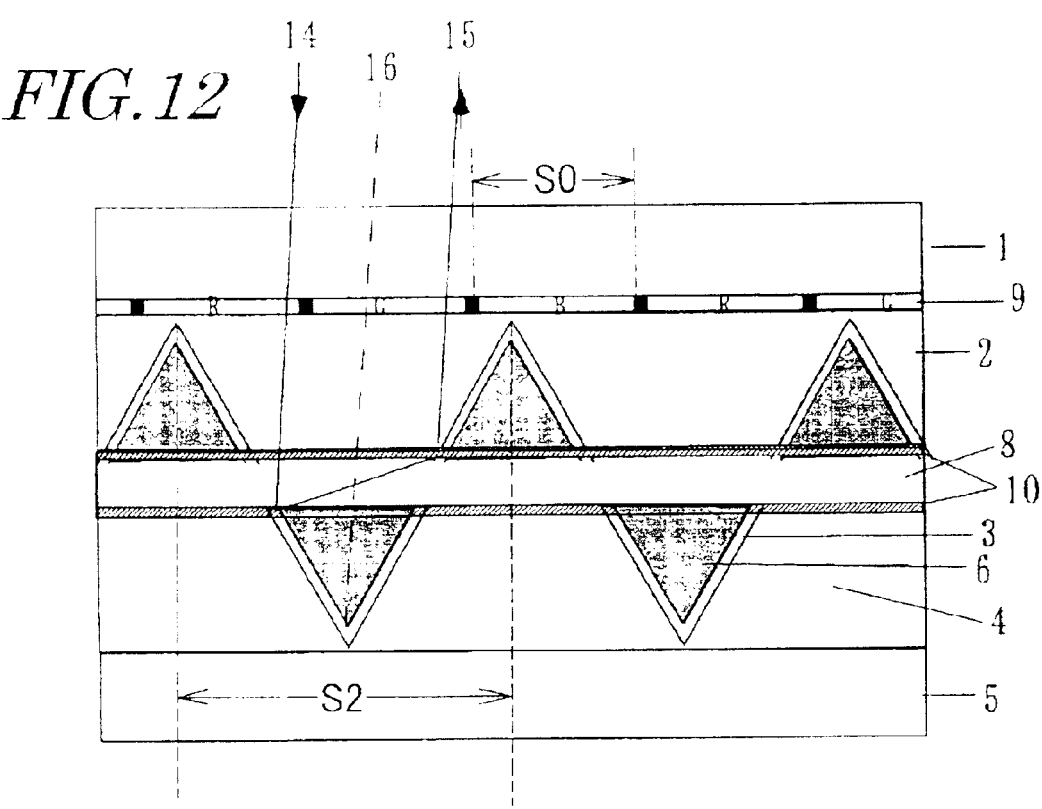
FIG. 12 is a cross-sectional view illustrating a situation where the size of a minimum unit structure of the corner cube array is set greater than the dot size of color filters in the reflective liquid crystal display device shown in FIG. 10.

In the display device shown in FIG. 11, the size S1 of a minimum unit structure of the corner cube array is equal to or smaller than the size S0 of a dot representing each color. In the example shown in FIG. 11, S1 is illustrated as being approximately equal to S0. In the display device shown in FIG. 12 on the other hand, the size S2 of a minimum unit structure of the corner cube array is greater than the size S0 of a dot representing each color. More specifically, in this preferred embodiment, the dots representing the respective colors are formed at a pitch of 100 µm, the minimum unit structure of the former corner cube array has a size S1 of 100 µm and the minimum unit structure of the latter corner cube array has a size S2 of 200 µm.

Each of these corner cube arrays retro-reflects an incoming light ray 14 back to its source so that the retro-reflected light ray 15 is parallel to the incoming light ray 14. At the same time, the corner cube array translates the incoming light ray 14 to a position symmetrical to the ray 14 with respect to a center axis 16.

In the display device illustrated in FIG. 11, the incoming light ray 14 is transmitted through a red (R) color filter 9 and the reflected part 15 thereof is also transmitted through the same R color filter 9. On the other hand, in the display device illustrated in FIG. 12, the incoming light ray 14 is transmitted through an R color filter 9 but the reflected part 15 thereof is transmitted through a green (G) color filter 9. That is to say, the incoming light ray 14 and the outgoing light ray 15 are transmitted through color filters of mutually different colors.

Thus, if each minimum unit structure of an optical element used as a retroreflector has a size equal to or smaller than the size of a dot representing each color, then it is possible to prevent the incoming and outgoing light rays from being transmitted through color filters of mutually different colors. As a result, color mixture is avoidable and decrease in brightness or chromaticity is suppressible.

Embodiment 6

A sixth specific preferred embodiment of the present invention relates to a liquid crystal display device implemented differently from the fourth or fifth preferred embodiment described above.

Figure 13:
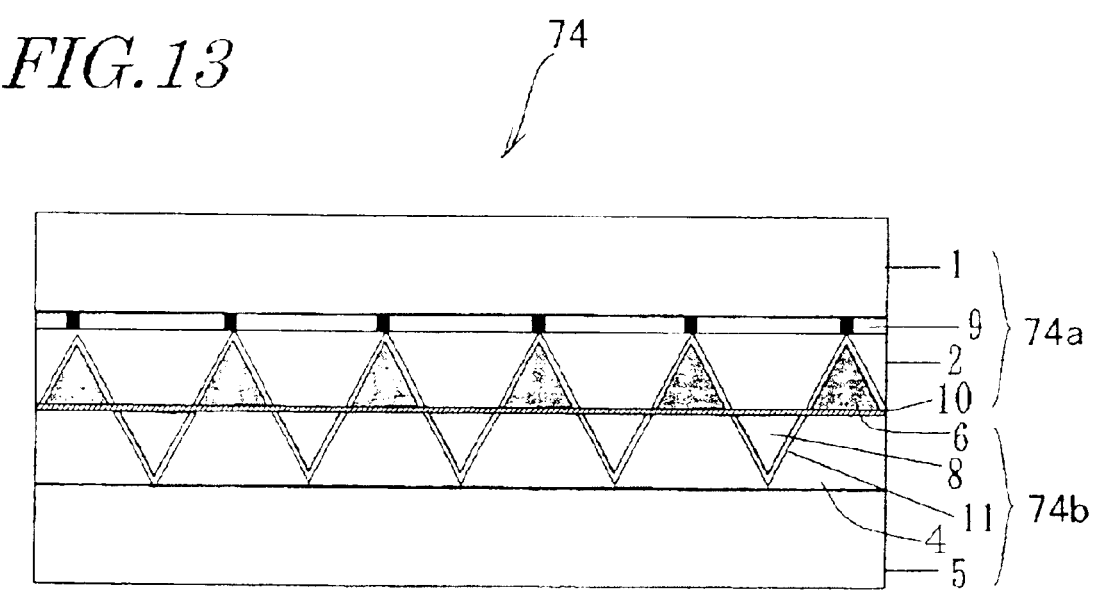
FIG. 13 is a cross-sectional view illustrating a configuration for a reflective liquid crystal display device according to a sixth specific preferred embodiment of the present invention.

FIG. 13 illustrates a reflective liquid crystal display device 74 according to this sixth preferred embodiment. As shown in FIG. 13, the reflective liquid crystal display device 74 has a structure in which an observer-side substrate 74a and a non-observer-side substrate 74b are bonded together. The observer-side substrate 74a has the same configuration as the observer-side substrate 72a described for the fifth embodiment, and may be formed by the same method as that used to make the observer-side substrate 72a.

On the other hand, triangular pyramidal concave portions, formed in the resin layer 4 of the non-observer-side substrate 74b, are filled with a scattering-type liquid crystal layer 8. Also, these triangular pyramidal concave portions are covered with a metallic reflective electrode film 11. In the reflective liquid crystal display device 74 of this preferred embodiment, the metallic reflective electrode film 11 not only reflects the incoming light but also serves as an electrode for applying a voltage to the scattering-type liquid crystal layer 8. The metallic reflective electrode film 11 may be formed by a method similar to that used to form the metallic reflective film 3 for the non-observer-side substrate 72b of the fifth embodiment.

In such a configuration, the liquid crystal layer 8 may be disposed without providing any gap between the observer-side and non-observer-side substrates 74a and 74b. Accordingly, a cubic corner cube array, which can retro-reflect the incoming light with more certainty and can utilize the incoming light even more efficiently, is obtained. As a result, a brighter image with improved visibility can be displayed.

Embodiment 7

A seventh specific preferred embodiment of the present invention relates to a technique of making an optical element of a type different from the cubic corner cube array by bonding together a pair of substrates, each including a plurality of concave portions.

FIGS. 14A through 14C and 15A through 15C illustrate a reflector for use to selectively reflect a light ray, which has been incident from a predetermined direction, to another direction without regularly reflecting it. A reflective liquid crystal display device using such a reflector is described in Japanese Laid-Open Publication No. 2000-221497, for example.

Figure 14A:
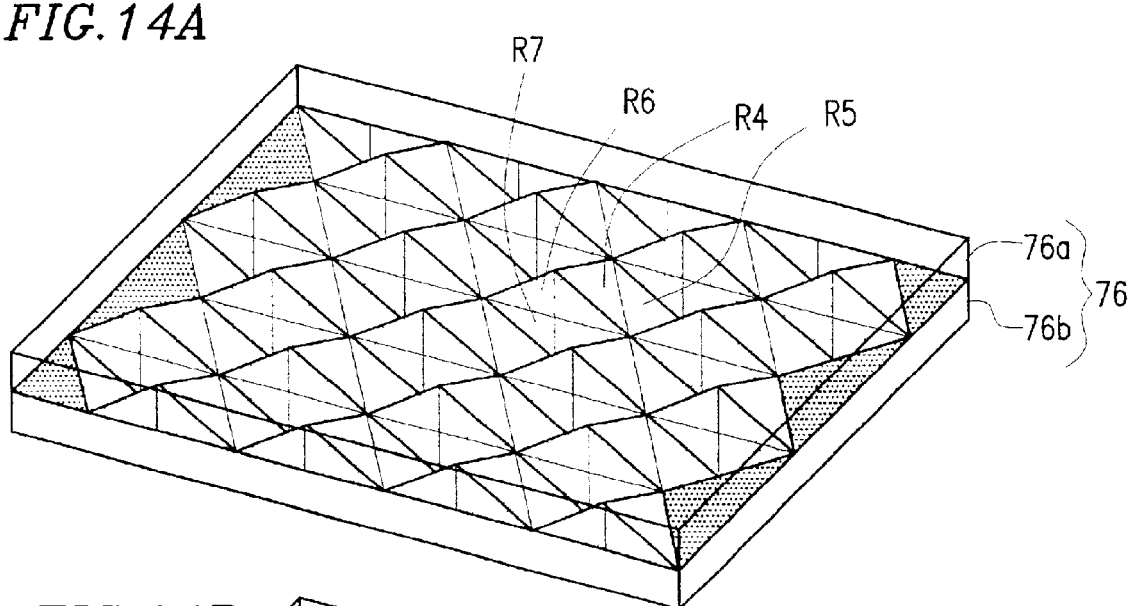
FIGS. 14A, 14B and 14C are perspective views illustrating an optical element according to a seventh specific preferred embodiment of the present invention.
Figure 14B:
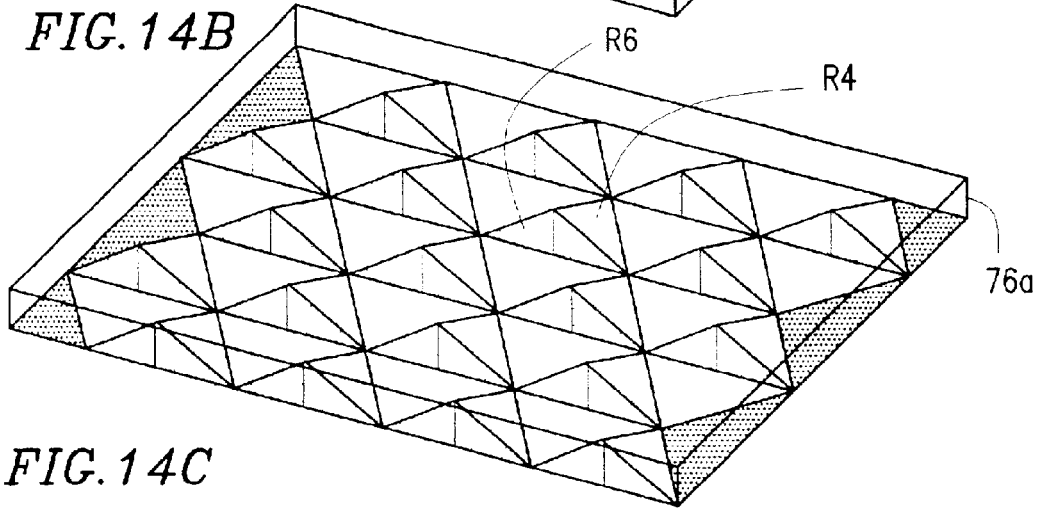
Figure 14C:
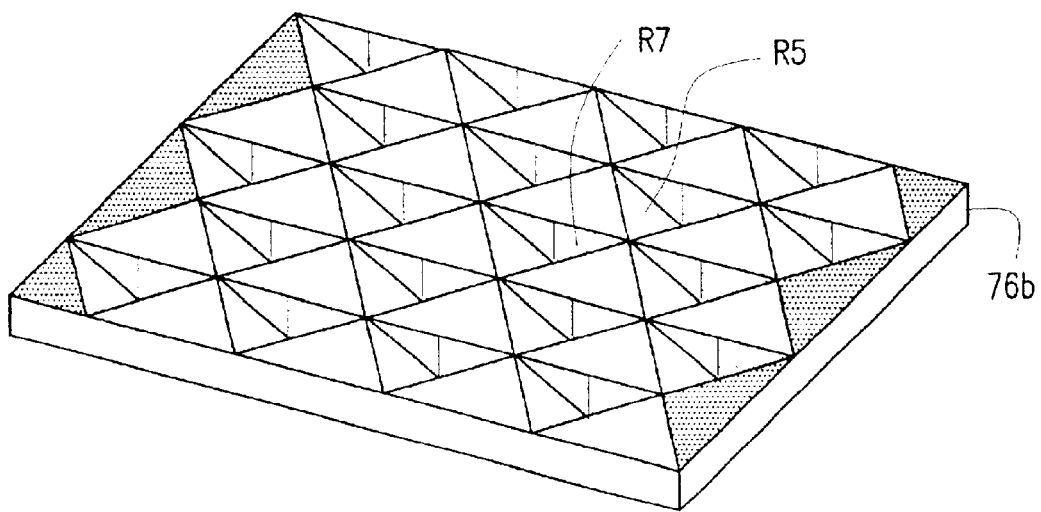
Figure 15A:
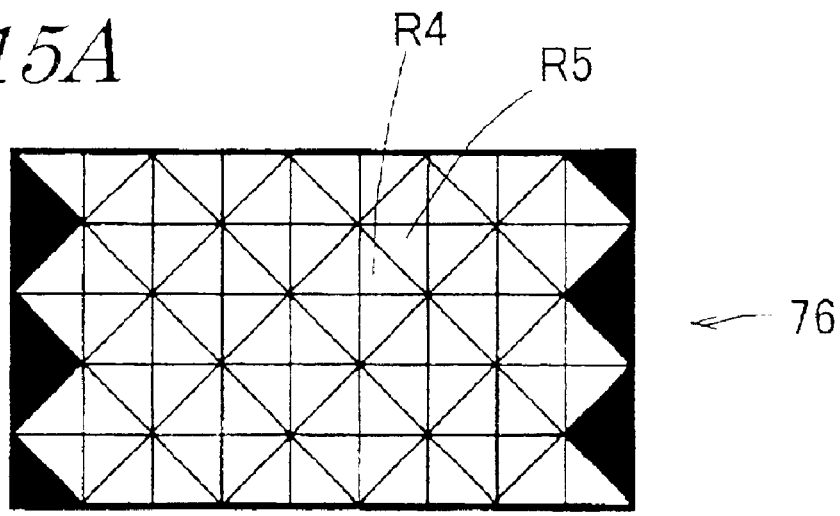
FIGS. 15A, 15B and 15C are plan views of the optical element shown in FIGS. 14A through 14C.
Figure 15B:
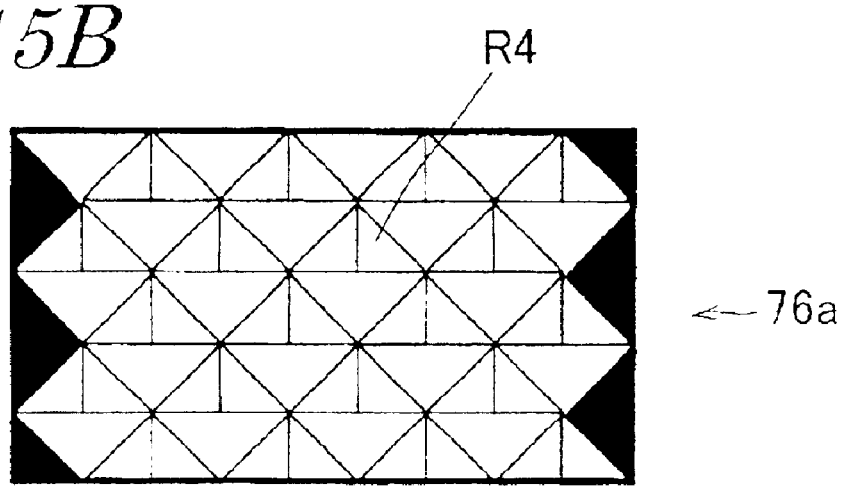
Figure 15C:
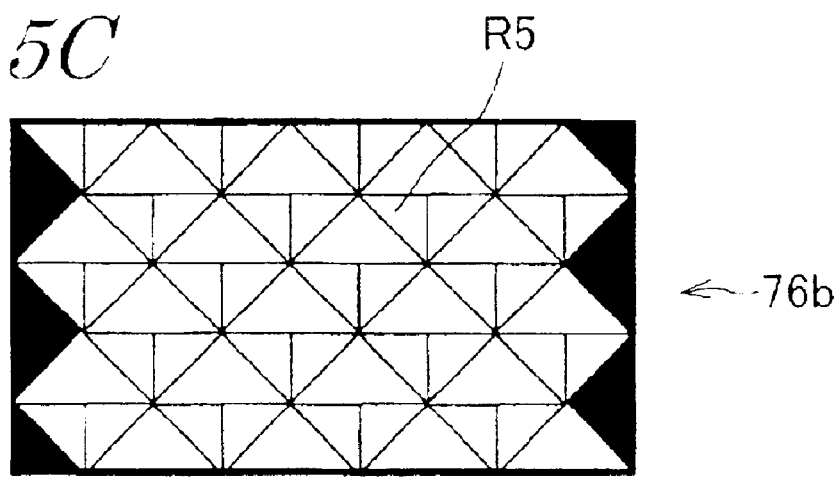
Figure 16A:
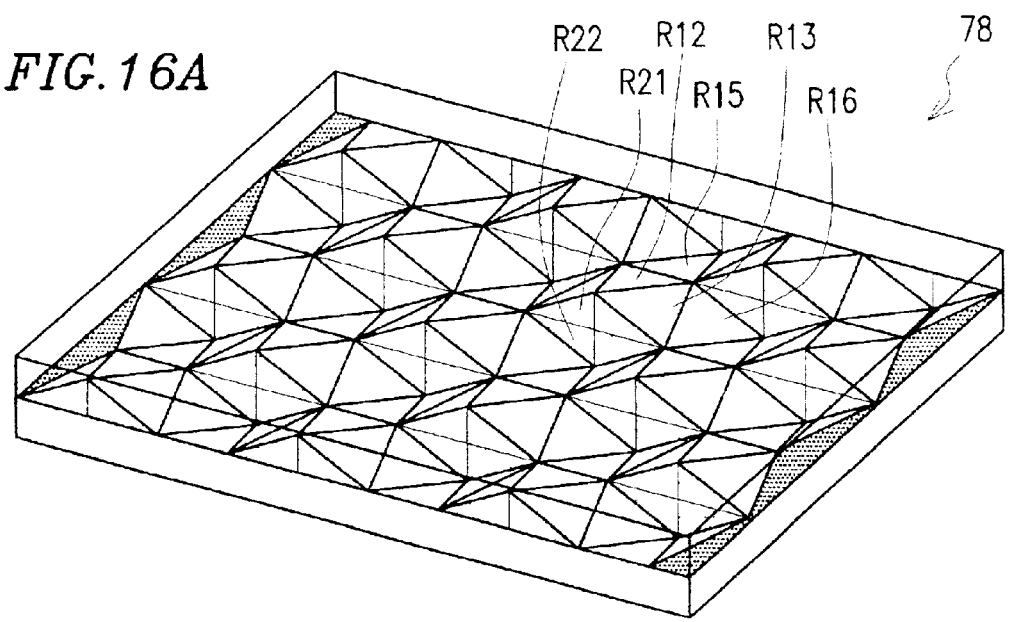
FIGS. 16A, 16B and 16C are perspective views illustrating another optical element according to the seventh embodiment.
Figure 16B:
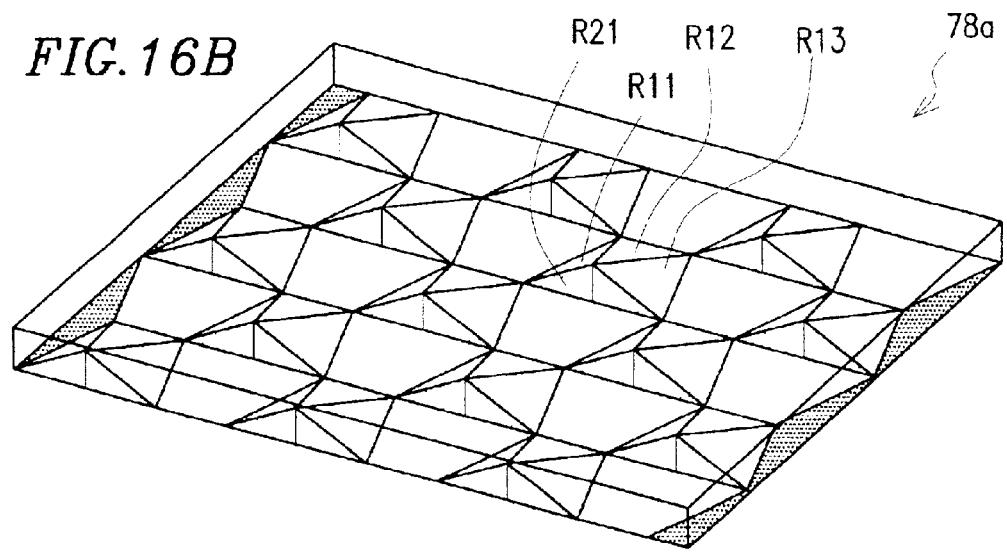
Figure 16C:
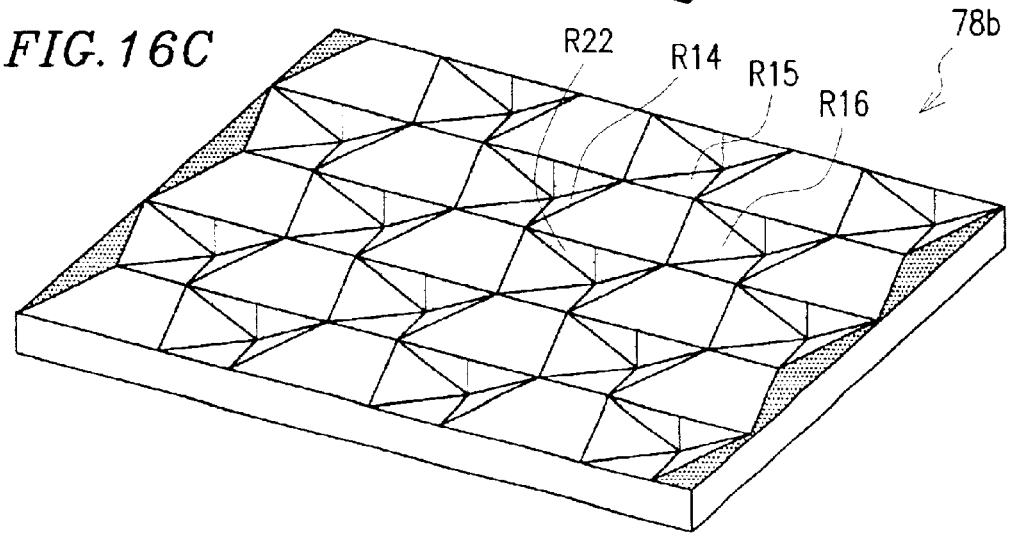
Figure 17A:
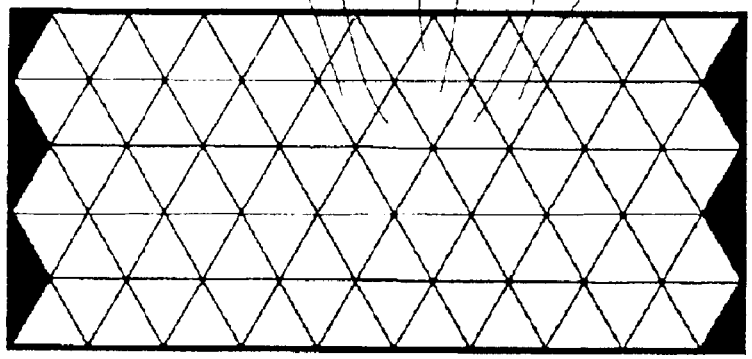
FIGS. 17A, 17B and 17C are plan views of the optical element shown in FIGS. 16A through 16C.
Figure 17B:
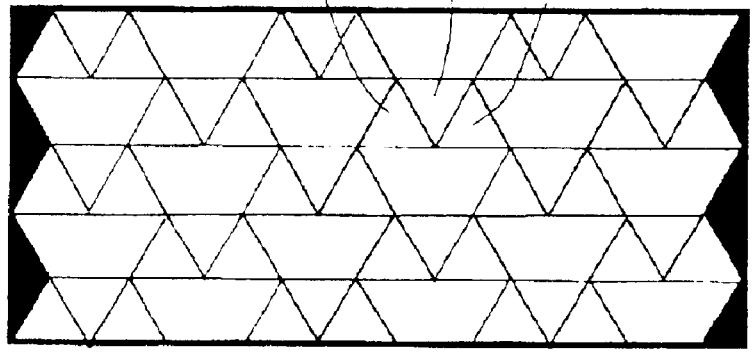
Figure 17C:
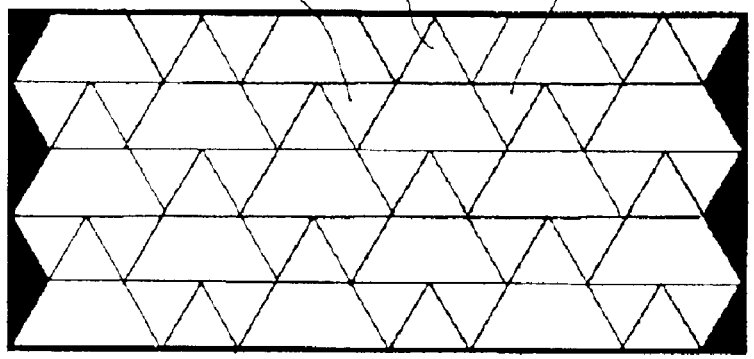

The reflector 76 shown in FIGS. 14A and 15A is obtained by stacking the transparent observer-side substrate 76a shown in FIGS. 14B and 15B on the non-observer-side substrate 76b shown in FIGS. 14C and 15C.

The surfaces of the observer-side and non-observer-side substrates 76a and 76b, which are opposed to each other when these substrates 76a and 76b are bonded together, are each provided with a plurality of triangular pyramidal concave portions. As shown in FIGS. 14B and 15B, each of the concave portions of the observer-side substrate 76a has a reflective plane R4 and a light absorbing plane R6. On the other hand, as shown in FIGS. 14C and 15C, associated ones of the concave portions of the non-observer-side substrate 76b have a reflective plane R5 and a light absorbing plane R7. Accordingly, when these substrates 76a and 76b are bonded together as shown in FIG. 14A, the two reflective planes R4 and R5 are disposed continuously with each other to form one reflective region and the two light absorbing planes R6 and R7 are also disposed continuously with each other to form one light absorbing region. The reflector 76 formed in this manner selectively reflects most of an incoming light ray to a direction without regularly reflecting it.

FIGS. 16A through 16C and 17A through 17C illustrate another type of reflector 78. This reflector 78 may also be used to selectively reflect an incoming light ray, which has been incident at a predetermined angle, to a desired direction. As shown in FIGS. 16A through 17C, the reflector 78 is obtained by bonding together a pair of substrates 78a and 78b. By combining reflective planes R11, R12 and R13 and a light absorbing plane R21 provided for each concave portion of the substrate 78a with reflective planes R14, R15 and R16 and a light absorbing plane R22 provided for associated concave portions of the substrate 78b, a reflector including complex concave and convex portions is realized.

Embodiment 8

An eighth specific preferred embodiment of the present invention relates to a technique of making a cubic corner cube by combining each of a plurality of concave portions formed in a substrate with a convex portion formed on the substrate.

Figure 18A:
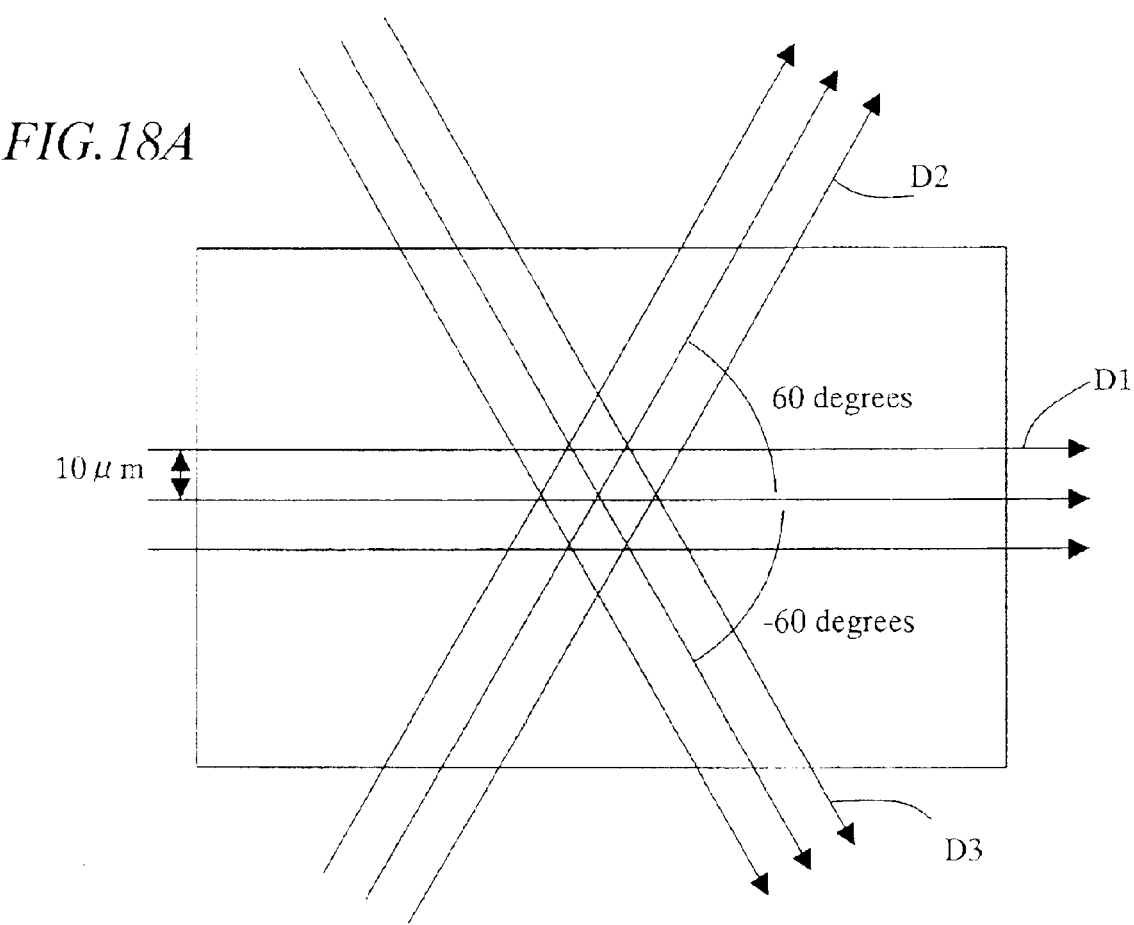
FIG. 18A is a plan view illustrating the three directions in which grooves are formed in making a die for use to fabricate a corner cube array according to an eighth specific preferred embodiment of the present invention.
Figure 18B:
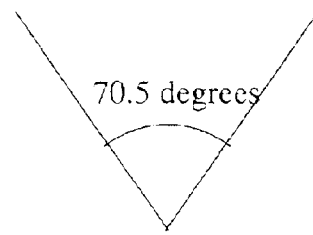
FIG. 18B illustrates the cutting-edge angle of a cutting tool for use to form the grooves.

First, by using a cutting tool as already described for the second embodiment (see FIG. 7A), multiple V-grooves are formed in three directions in the surface of a metal plate (i.e., base material) of brass, nickel or any other suitable material. These three cutting directions are defined as shown in FIG. 18A. Specifically, after a cutting direction D1 is determined as a reference, a second cutting direction D2 is defined so as to form an angle of +60 degrees with the reference cutting direction D1 and a third cutting direction D3 is defined so as to form an angle of −60 degrees with the reference cutting direction D1. Also, the cutting-edge angle (point angle) of the cutting tool is set at about 70.5 degrees as shown in FIG. 18B and the grooves are formed at a pitch of 10 μm as shown in FIG. 18A.

Figure 20:
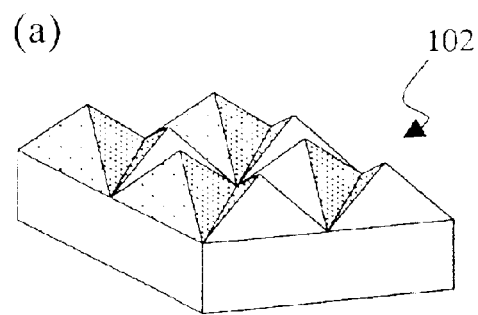
FIG. 20 illustrates perspective views corresponding to respective process steps (a), (b), (e1), (e2) and (h) shown in FIG. 19 for making the corner cube array of the eighth embodiment.
Figure 20:
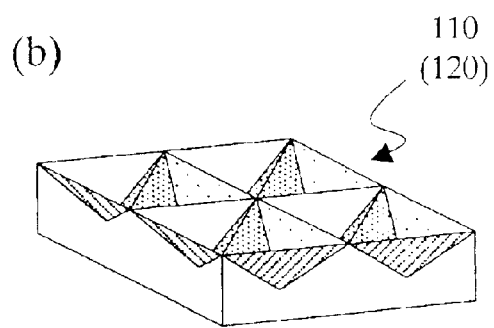
Figure 20:
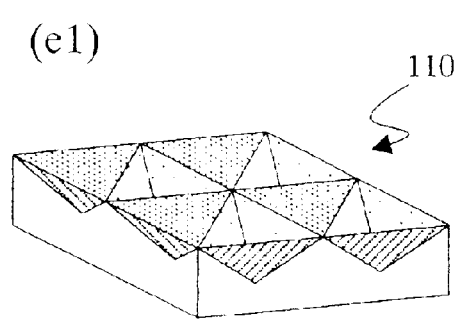
Figure 20:
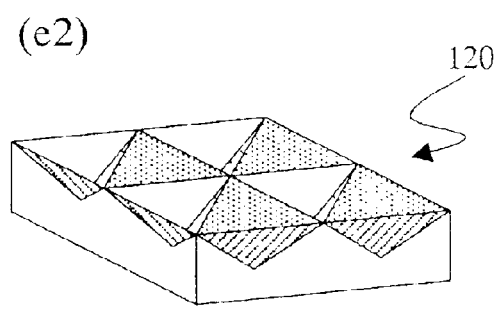
Figure 20:
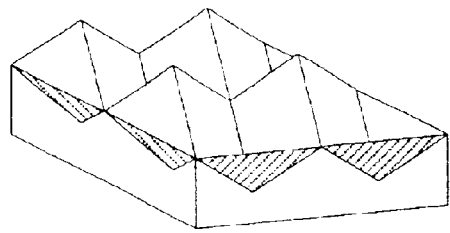

As a result, multiple triangular pyramidal convex portions are densely formed in the surface of the metal plate by the inner surfaces of the grooves extending in the three directions. Portion (a) of FIG. 20 is a perspective view illustrating those triangular pyramidal convex portions formed in this manner. Since the cutting-edge angle of the cutting tool is adjusted in the above-described manner, the three triangular facets that make up each triangular pyramidal convex portion are in the shape of a rectangular isosceles triangle and are opposed perpendicularly to each other. The bottom of each triangular pyramidal convex portion is in the shape of an equilateral triangle.

Figure 19:
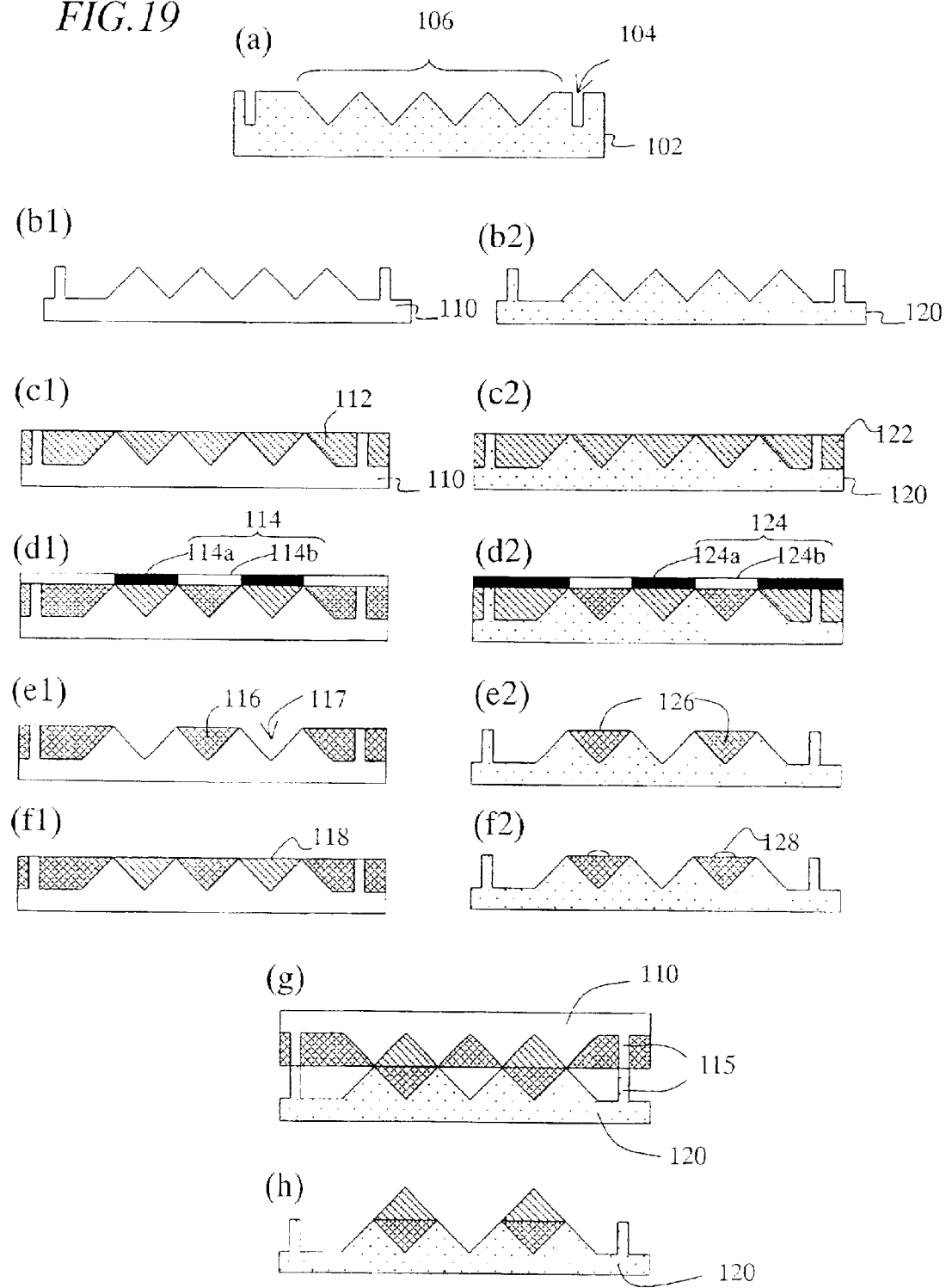
FIG. 19 illustrates cross-sectional views corresponding to respective process steps for making the corner cube array of the eighth embodiment.

Also, as shown in portion (a) of FIG. 19, cut grooves 104 for use as an alignment marker are formed so as to surround a region 106 in which those triangular pyramidal convex portions have been formed. In this case, the cut grooves 104 are formed so that the bottom of the alignment marker grooves 104 is leveled with that of the triangular pyramidal convex portions. In this manner, a die 102 is completed.

Next, as shown in portion (b1) of FIG. 19, a negative 110 is made of an acrylic material (e.g., Acrypet produced by Mitsubishi Rayon Co., Ltd.) using this die 102. A number of triangular pyramidal concave portions, having a shape corresponding to that of the triangular pyramidal convex portions of the die 102, are formed in this negative 110 as shown in portion (b) of FIG. 20. That is to say, the three rectangular isosceles triangular facets, making up each of these triangular pyramidal concave portions, are also opposed mutually perpendicularly.

Subsequently, as shown in portion (c1) of FIG. 19, those concave portions of the negative 110 are filled with a photo-curable resin material 112, for example. In this preferred embodiment, a negative photoresist (e.g., ONNR-22 produced by Tokyo Ohka Kogyo Co., Ltd.) is used as the resin material 112. In this manner, the concave portions of the negative 110 are flattened. This flattening process step will be described in further detail later.

In the meantime, as shown in portion (b2) of FIG. 19, another negative 120 is made of a material such as nickel by using the same die 102. As shown in portion (b) of FIG. 20, this negative 120 also has a plurality of triangular pyramidal concave portions, each being made up of three rectangular isosceles triangular facets that are opposed perpendicularly to each other.

Subsequently, as shown in portion (c2) of FIG. 19, those concave portions of the negative 120 are also filled with a photo-curable resin material 122. In this preferred embodiment, a negative photoresist (e.g., ONNR-22 produced by Tokyo Ohka Kogyo Co., Ltd.) is also used as the resin material 122. In this manner, the concave portions of the negative 120 are flattened. This flattening process step will be described in further detail later.

Figure 21:
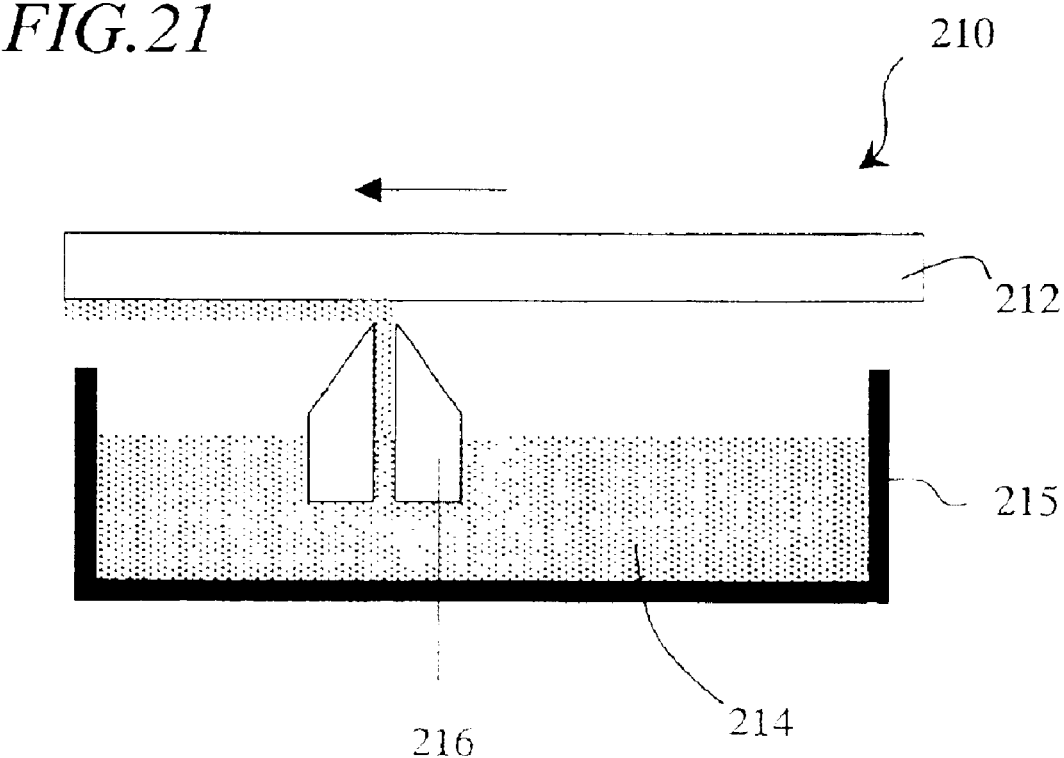
FIG. 21 is a cross-sectional view illustrating an apparatus for use to make the corner cube array of the eighth embodiment.

In this preferred embodiment, the concave portions of the negatives 110 and 120 are filled with the resin material 112 and 122 by using the apparatus 210 shown in FIG. 21. In this flattening apparatus 210, a liquid 214 (i.e., the photo-curable resin material 112 or 122 yet to be cured) to be applied onto the surface of a substrate 212 (i.e., the negative 110 or 120 in this case) is stored in a reservoir 215 and then fed through the end of a nozzle 216 by utilizing capillary action. Then, the substrate 212, which is disposed to keep contact with the end of the nozzle 216, is moved horizontally. In this manner, the entire surface of the substrate 212 can be evenly coated with the liquid 214, and the surface of the substrate 212 coated with the liquid 214 can be flattened. It should be noted that if the surface should be further planarized, the substrate surface may be polished after the resin material 112 or 122, with which the concave portions of the negative 110 or 120 are filled, has been cured.

Next, as shown in portions (d1) and (d2) of FIG. 19, the resin materials 112 and 122 are exposed to light through a photomask 114 having opaque and transparent portions 114a and 114b and a photomask 124 having opaque and transparent portions 124a and 124b, respectively. The opaque portions 114a and 124a and transparent portions 114b and 124b of these photomasks 114 and 124 have an equilateral triangular planar shape corresponding to that of the triangular pyramidal concave portions that have been filled with the resin materials 112 and 122. In these photomasks 114 and 124, the opaque and transparent portions 114a, 114b and 124a, 124b are arranged alternately. However, the arrangement of the opaque and transparent portions 114a and 114b in the photomask 114 is opposite to that of the opaque and transparent portions 124a and 124b in the photomask 124.

In this preferred embodiment, the resin materials 112 and 122 are negative photoresist, and parts of the materials 112 and 122 that have been exposed to the light transmitted through the transparent portions 114b, 124b are cured. Accordingly, as shown in portions (e1) and (e2) of FIG. 19, parts of the resin materials 112 and 122 that fill the concave portions corresponding to the transparent portions 114b and 124b of the photomasks 114 and 124 are selectively cured. Thus, the photoresists are developed so that only those portions are left as flattening members 116 and 126. Portions (e1) and (e2) of FIG. 20 illustrate the negatives 110 and 120 that have their surface partially flattened by getting predetermined concave portions selectively filled in this manner.

Subsequently, in the negative 110 made of an acrylic material, the remaining concave portions 117 thereof that have not been filled with the flattening member 116 are coated with a release agent (e.g., Diefree produced by Daikin Industries, Ltd.) and then filled with a photo-curable acrylate monomer. The monomer is exposed, polymerized and cured, thereby forming triangular pyramidal solids 118 as shown in portion (f1) of FIG. 19. The exposed surface of these solids 118 is preferably flat. Accordingly, the exposed surface may be further filled with a monomer by using the flattening apparatus 210 shown in FIG. 21 or may be polished after the monomer has been cured.

As for the other negative 120 made of nickel, an adhesive 128 (e.g., StructBond produced by Mitsui Chemicals, Inc.) is applied onto the flattening member (i.e., negative photoresist) 126 thereof by using a dispenser or by a screen printing method. Optionally, plastic beads having a particle size of about 1 μm may be mixed into the adhesive 128 to control the thickness of the adhesive 128 more appropriately.

Thereafter, as shown in portion (g) of FIG. 19, the negative 110 shown in portion (f1) of FIG. 19 is bonded onto the negative 120 shown in portion (f2) of FIG. 19. In this process step, the negatives 110 and 120 are opposed in such a manner that the solids 118 retained in the negative 110 face the flattening member 126 filling the concave portions of the negative 120 and that the solids 118 and the flattening member 126 are secured to each other via the adhesive 128. In this case, the negatives 110 and 120 can be accurately aligned with each other by using the alignment markers 115 provided for the negatives 110 and 120. As a result, each of the substantially square planes that make up a cubic corner cube can have good profile irregularity (or planarity).

Subsequently, as shown in portion (h) of FIG. 19, the negative 110 is released. As a result, the solids 118 that have been retained in the negative 110 are transferred onto the negative 120 as shown in portion (h) of FIG. 20. In this manner, a cubic micro corner cube array is formed. It should be noted that the negative 120 having the micro corner cube array thereon may be used as a die for making a micro corner cube array in the surface of a resin layer, for example. In that case, a die covered with a material such as nickel may be made from this negative 120 by an electroforming technique and then the surface shape (or unevenness) of the die obtained in this manner may be transferred onto another resin film, for example, to form a micro corner cube array.

Embodiment 9

A ninth specific preferred embodiment of the present invention relates to another technique of making a cubic corner cube of a concave portion that has been formed in a substrate and a convex portion that has been formed on the substrate differently from the eighth preferred embodiment described above. Specifically, in this ninth preferred embodiment, cubic single crystalline substrates, whose surface is parallel to the {111} planes of single crystals, are prepared and the surface of the substrates is etched anisotropically to obtain an uneven surface as a cubic corner cube array.

Figure 22A:
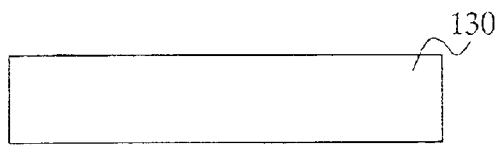
FIGS. 22A and 22B illustrates cross-sectional views corresponding to respective process steps for making a corner cube array according to a ninth specific preferred embodiment of the present invention.
Figure 22A:
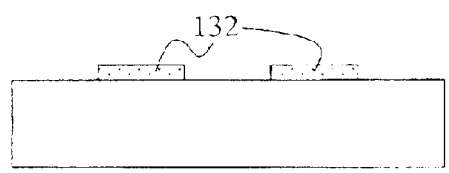
Figure 22A:
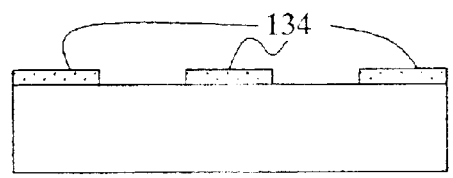
Figure 22A:
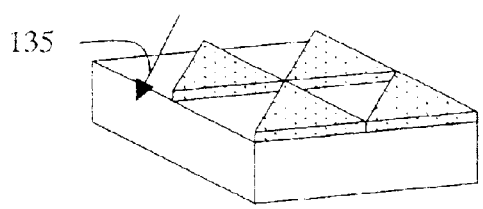
Figure 22A:
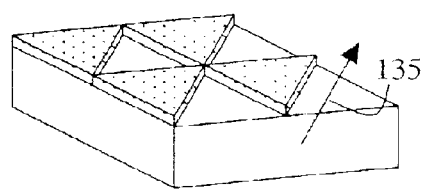
Figure 22A:
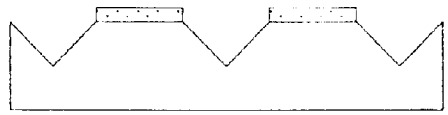
Figure 22A:
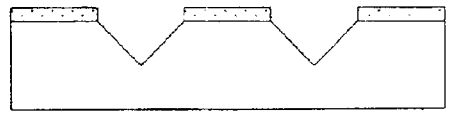

First, as shown in portion (a) of FIG. 22A, two single crystalline substrates 130 of germanium, whose surface is parallel to the {111} planes of crystals, are prepared. Next, as shown in portions (b1) and (b2) of FIG. 22A, resist masks 132 and 134, each having a plurality of openings of an equilateral triangular planar shape, are formed on these two substrates 130. Portions (b1') and (b2') of FIG. 22A are perspective views of the substrates 130 and resist masks 132 and 134 shown in portions (b1) and (b2) of FIG. 22A, respectively.

In this case, the equilateral triangles of the resist masks 132 and 134 have a length of 11.5 μm each side and are arranged so that each side thereof is parallel to the {100} planes of the germanium single crystals. In portions (b1') and (b2') of FIG. 22A, the resist mask pattern elements and openings are illustrated as forming mutually opposite patterns and these substrates 130 are illustrated as if their orientations were shifted from each other by 180 degrees. Thus, the resist mask patterns formed on these substrates 130 are actually the same. In portions (b1') and (b2') of FIG. 22A, two directions parallel to the {100} planes of single crystals are indicated by the arrows 135, for example. When these resist mask patterns are viewed from this reference direction, it can be seen that the resist mask patterns on these substrates are the same.

Next, these substrates 130 are etched. In this etching process step, a mixture of hydrofluoric acid, hydrogen peroxide water and water (where 50 wt % of HF: 30 wt % of $H_2O_2:H_2O=1:1:4$) is used as an etchant, the etch temperature is set at 1 degree and the etch time is set at 15 minutes. As a result, the concave portions shown in portions (c1) and (c2) of FIG. 22A are formed.

In this process step, the etching process starts from the {111} planes. However, the etch rate of {100} planes, including planes that cross each other at right angles, is lower than that of the {111} planes. Accordingly, the etching process advances anisotropically so that these {100} planes are exposed.

Figure 22B:
Figure 22B:
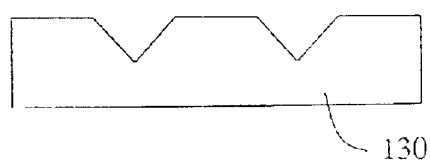
Figure 22B:
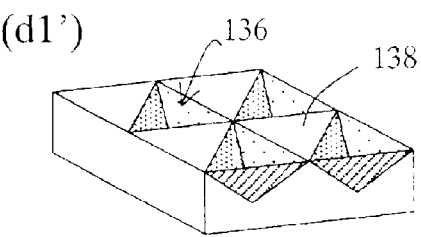
Figure 22B:
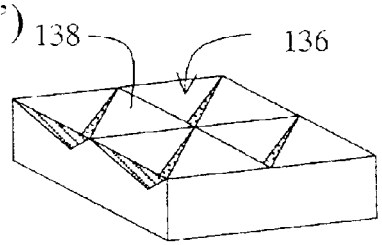
Figure 22B:
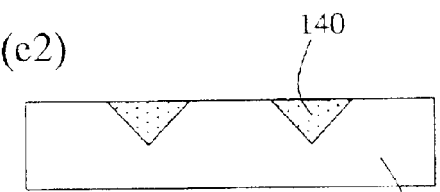
Figure 22B:
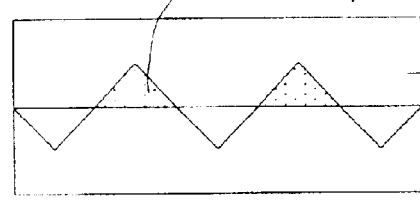
Figure 22B:
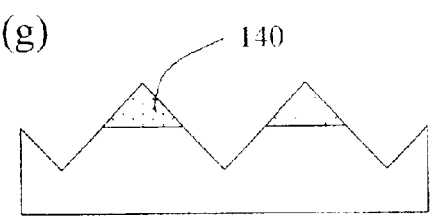
Figure 22B:
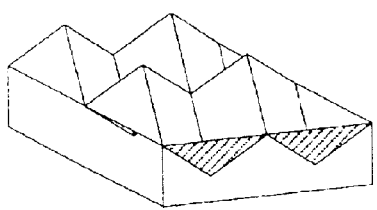

Thereafter, as shown in portions (d1) and (d2) of FIG. 22B, the resist masks 132 and 134 are stripped from the surface of the substrates. Portions (d1') and (d2') of FIG. 22B illustrate the substrates from which the resist masks 132 and 134 have been removed. As can be seen from these portions (d1') and (d2') of FIG. 22B, a plurality of triangular pyramidal concave portions 136, each being made up of three rectangular isosceles triangular facets that are opposed substantially perpendicularly to each other, are formed in each of these substrates. A flat portion 138 is formed between adjacent ones of the concave portions 136.

Next, as shown in portion (e2) of FIG. 22B, the concave portions 136 of one of the two substrates are filled with a photo-curable acrylate monomer, which is exposed, polymerized and cured, thereby forming triangular pyramidal solids 140. The exposed surface of these solids 140 is preferably flat. Accordingly, the exposed surface may be filled with the monomer by using the flattening apparatus 210 shown in FIG. 21 or may be polished after the monomer has been cured.

Thereafter, as shown in portion (f) of FIG. 22B, the substrate shown in portion (e2) of FIG. 22B is bonded onto the substrate shown in portion (d1) of FIG. 22B. In this process step, the substrates are opposed in such a manner that the solids 140 retained in one of the two substrates face the flat portions 138 of the other substrate and that the solids and flat portions 140 and 138 are secured to each other via an adhesive.

Subsequently, as shown in portion (g) of FIG. 22B, the substrate shown in portion (e2) of FIG. 22B is removed. As a result, the solids 140 are transferred onto the flat portions 138 of the other substrate, thereby forming a cubic micro corner cube array such as that shown in portion (g') of FIG. 22B.

A member having the concave portions 136 and flat portions 138 in its surface as shown in (d1), (d1'), (d2) and (d2') of FIG. 22B may also be prepared by another method. For example, the member may also be formed by directly pressing a pin, having a triangular pyramidal convex portion made up of three isosceles triangular facets that are opposed perpendicularly to each other, against a base material of nickel, for example, as already described for the first embodiment. Even when a member obtained in this manner is used, a micro corner cube array may also be formed by performing the process steps shown in portions (e2), (f) and (g) of FIG. 22B.

It should be noted that the substrate 130 having the micro corner cube array thereon may be used as a die for making a micro corner cube array in the surface of a resin layer, for example. In that case, a die covered with a material such as nickel may be made from this substrate 130 by an electroforming technique and then the surface shape (or unevenness) of the die obtained in this manner may be transferred onto another resin film, for example, to form a micro corner cube array.

Embodiment 10

In a tenth specific preferred embodiment of the present invention, a cubic single crystalline substrate, whose surface is parallel to the {111} planes of single crystals, is also prepared and the surface of the substrate is etched anisotropically to obtain an uneven surface as a cubic corner cube array.

Figure 23A:
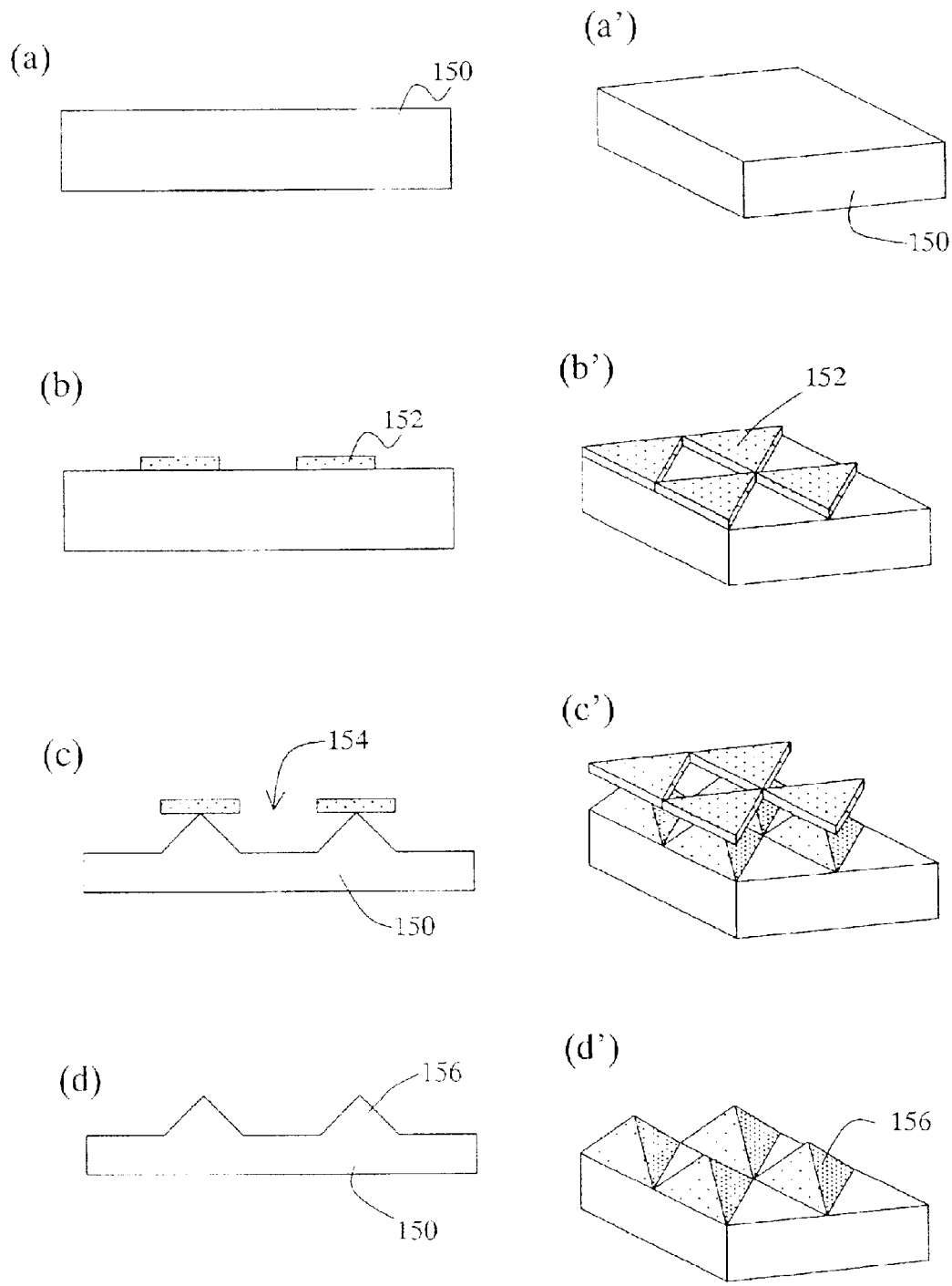
FIGS. 23A and 23B illustrates cross-sectional views corresponding to respective process steps for making a corner cube array according to a tenth specific preferred embodiment of the present invention.

First, as shown in portions (a) and (a') of FIG. 23A, a single crystalline substrate 150 of gallium arsenide, whose surface is parallel to the {111} B planes of crystals, is prepared. It should be noted that the {111} B planes of gallium arsenide crystals refer to the {111} planes formed by arsenide.

Next, as shown in portions (b) and (b') of FIG. 23A, a resist mask 152, having a plurality of openings of an equilateral triangular planar shape, is formed on the substrate 150. In this case, the equilateral triangles of the resist mask 152 have a length of 11.5 $\mu$m each side and are arranged so that each side thereof is parallel to the {100} planes of the gallium arsenide single crystals.

Subsequently, the substrate 150 is etched. In this etching process step, a mixture of ammonia water, hydrogen peroxide water and water (where 28 wt % of $NH_4OH$: 30 wt % of $H_2O_2:H_2O=8:2:5$) is used as an etchant, the etch temperature is set at 17 degrees and the etch time is set at 2 minutes. As a result, convex portions are formed as shown in portions (c) and (c') of FIG. 23A.

In this preferred embodiment, parts of the substrate 150 that have been covered with the resist mask 152 are also etched away, and flat portions are formed in other parts of the substrate 150 corresponding to the openings 154 of the mask 152. This is because under the etching conditions specified above, the etch rate of the {111} B planes of gallium arsenide single crystals is not so much higher than that of the {100} planes thereof.

That is to say, since the etch rate of the {100} planes of the crystals is low under these etching conditions, the etching process advances so that the {100} planes are exposed. In addition, the etching process does not advance so rapidly in the substrate thickness direction (i.e., the direction perpendicular to the {111} B planes), and the bottom of the concave portions does not decrease its size. As can be seen, the substrate surface shape formed by this anisotropic etching process is modifiable by adopting an appropriate etch selectivity of the {100} planes to the {111} B planes.

In this preferred embodiment, as the etching process advances, the area of contact between the resist mask 152 and the substrate surface decreases. And when the desired etching process is finished, there is almost no contact area between the resist mask 152 and the substrate surface as shown in portions (c) and (c') of FIG. 23A. Accordingly, even without performing the resist stripping process step of the ninth embodiment, a substrate having a plurality of triangular pyramidal convex portions 156, each being made up of three rectangular isosceles triangular facets that are opposed substantially perpendicularly to each other, can be obtained as shown in portions (d) and (d') of FIG. 23A.

Figure 23B:
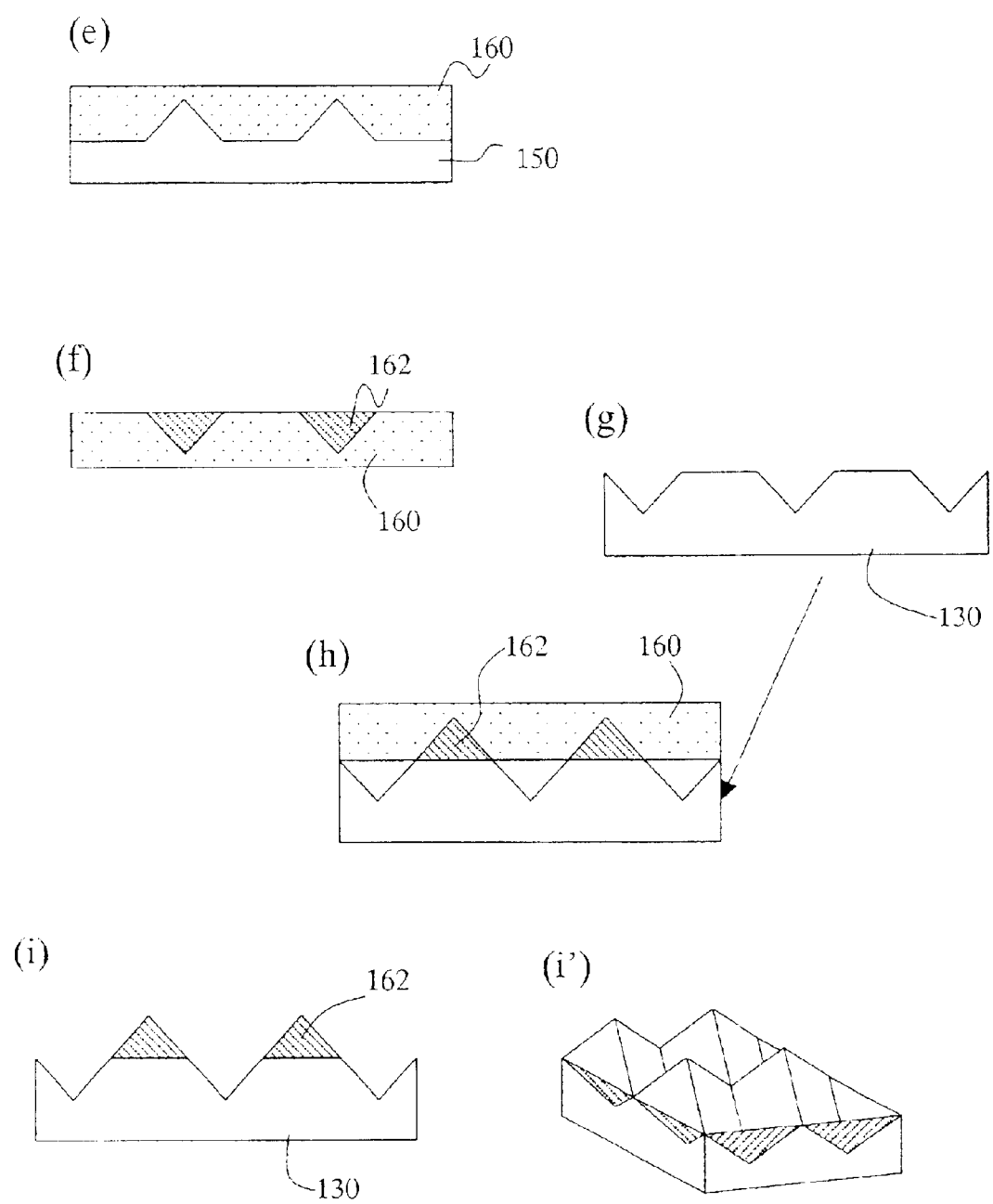

Thereafter, as shown in portion (e) of FIG. 23B, an aluminum film 160 is deposited to a thickness of about 20 $\mu$m over the substrate 150 shown in portions (d) and (d') of FIG. 23A by using a sputtering apparatus, for example. Then, the aluminum film 160 is removed from the substrate 150. In the aluminum film 160 removed in this manner, a plurality of triangular pyramidal concave portions, having a shape corresponding to that of the convex portions 156 of the substrate 150, are formed.

Next, as shown in portion (f) of FIG. 23B, the concave portions formed in the aluminum film 160 are filled with a photo-curable acrylate monomer, which is then exposed, polymerized and cured, thereby forming triangular pyramidal solids 162.

Subsequently, as shown in portion (h) of FIG. 23B, the aluminum film 160 shown in portion (f) of FIG. 23B is bonded onto the substrate 130 according to the eighth embodiment shown in portion (g) of FIG. 23B (corresponding to portion (d1) of FIG. 22B). In this process step, the aluminum film 160 and the substrate 130 are opposed in such a manner that the solids 162 retained in the aluminum film 160 face the flat portions 138 of the substrate 130 and that the solids 162 and flat portions 138 are secured to each other.

Next, the aluminum film 160 and the substrate 130 that have been secured to each other in this manner are immersed in an alkaline solution, thereby selectively dissolving only the aluminum film 160. As a result, a cubic micro corner cube array such as that shown in portions (i) and (i') of FIG. 23B is obtained.

A die may be made by an electroforming technique from the micro corner cube array obtained in this manner and a micro corner cube array may be formed in a resin film, for example, by using the die.

EXAMPLE AND COMPARATIVE EXAMPLE

The display characteristics of two reflective liquid crystal display devices, which were made as an example of the present invention by using a cubic corner cube array that had been formed with two substrates and as a comparative example by using a triangular pyramidal corner cube array that had been formed on a single substrate, respectively, were measured.

The following Table 1 shows the reflectances that were measured vertically under a diffused illuminator for these two types of devices.

TABLE 1

|  | White Display Reflectance (%) | Black Display Reflectance (%) | Contrast Ratio |
|---|---|---|---|
| Example | 30 | 1.9 | 15.8 |
| Comp. example | 33 | 5.5 | 6.0 |

As can be seen from Table 1, the display device as an example of the present invention showed a black display reflectance lower than that of the display device as a comparative example, and could display color black more satisfactorily. This is because the display device as the example of the present invention includes a reflector implemented as a cubic corner cube array that can retro-reflect ambient light more efficiently, whereas the display device as the comparative example cannot retro-reflect part of the ambient light and allows that part of the light to be observed. As a result, the display device as the example of the present invention showed a contrast ratio much better than that of the display device as the comparative example.

According to the present invention, an optical element of a very small size, suitably applicable to a display device and other types of devices, can be made relatively easily. For example, a micro corner cube array for retro-reflecting incoming light highly efficiently can be made easily enough. A display device including such a micro corner cube array realizes a display at high contrast ratio, high color purity and good visibility.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical element comprising:
   a first member, which has a first surface including a first concave portion, the first concave portion being made up of three triangular facets that are opposed substantially perpendicularly to each other;
   a second member, which has a second surface including a second concave portion and which transmits incoming light therethrough, the second concave portion being made up of three triangular facets that are opposed substantially perpendicularly to each other, and the first and second members being disposed so that the first and second surfaces are opposed to each other,
   wherein the optical element comprises a plurality of cubic corner cubes, each of which comprises a first set of triangular planes defined by the first concave portion and a second set of triangular planes defined by the second concave portion so as to provide each cubic corner cube with substantially square reflective planes opposed substantially perpendicular to one another; and
   wherein first and second reflective regions have been formed on the first and second concave portions, respectively, and
   wherein at least part of the incoming light that has been transmitted through the second member is reflected from at least one of the first and second reflective regions.

2. The optical element of claim 1, wherein the first surface includes the first concave portion and a flat portion, the second surface includes the second concave portion and a flat portion, and the first and second concave portions are so disposed as not to face each other.

3. The optical element of claim 1, wherein the first and second concave portions have substantially the same shape.

4. The optical element of claim 1, wherein at least part of the incoming light that has been transmitted through the second member is reflected from both the first and second reflective regions so that the incoming light is retro-reflected.

5. The optical element of claim 1, wherein at least one of the first and second reflective regions is made of a metal film.

6. The optical element of claim 1, wherein the second reflective region is made of a material that has a refractive index lower than that of the second member.

7. The optical element of claim 6, further comprising a member for filling the first concave portion on the first reflective region, wherein the first reflective region is made of a material that has a refractive index lower than that of the member for filling the first concave portion.

8. A reflective display device comprising: the optical element as recited in claim 1; and a light modulating layer interposed between the first and second members.

9. The reflective display device of claim 8, wherein the light modulating layer comprises a scattering-type liquid crystal layer.

10. The reflective display device of claim 9, further comprising:
   a first flattening member that fills the first concave portion of the first member; and
   a second flattening member that fills the second concave portion of the second member,
   wherein the scattering-type liquid crystal layer is interposed between the surface of the first member that has been flattened by the first flattening member and the surface of the second member that has been flattened by the second flattening member.

11. The reflective display device of claim 9, wherein the scattering-type liquid crystal layer fills the first concave portion of the first member.

12. A reflective display device comprising: the optical element as recited in claim 1; a transparent substrate disposed to face the optical element; and a light modulating layer, which is interposed between the optical element and the transparent substrate and controlled to assume either a light scattering state or a light transmitting state.

13. The optical element of claim 1, wherein the first and second members are respectively extended along a common plane, and the first and second reflective regions do not overlap each other as viewed in a normal direction to the common plane.

14. The optical element of claim 1, wherein each of the cubic corner cubes has three substantially square planes that are opposed substantially perpendicularly to each other, and each of the square planes is defined by one of the triangular facets of the first concave portion and one of the triangular facets of the second concave portion.

15. The optical element of claim 1, further comprising a liquid crystal layer located between the first and second members.

16. The optical element of claim 15, wherein the liquid crystal layer is a scattering-type liquid crystal layer.

17. A method of making an optical element, the method comprising:

forming a first concave portion on a first surface of a first member and forming a first reflective region on the first concave portion;

forming a second concave portion on a second surface of a second member and forming a second reflective region on the second concave portion; and disposing the first and second members in such a manner that the first and second members extend along a common plane, that the first surface of the first member is opposed to the second surface of the second member and that the first and second reflective regions do not overlap each other as viewed in a normal direction to the common plane.

18. A method of making a corner cube array, comprising the steps of:

a) preparing a first member in which at least one first concave portion has been formed in a triangular pyramidal shape, the first concave portion being made up of three triangular facets that are opposed substantially perpendicularly to each other;

b) preparing a second member in which at least one second concave portion has been formed in the triangular pyramidal shape, the second concave portion being made up of three triangular facets that are opposed substantially perpendicularly to each other; and c) disposing the first and second members in such a manner that a surface of the first member in which the first concave portion has been formed is opposed to a surface of the second member in which the second concave portion has been formed, wherein the corner cube array is made up of a plurality of cubic corner cubes, each of which comprises a first set of triangular planes defined by the first concave portion and a second set of triangular planes defined by the second concave portion.

19. The method of claim 18, further comprising the steps of:

forming a reflective region on each of the three triangular facets of the first concave portion; and forming a reflective region on each of the three triangular facets of the second concave portion, wherein the second member is transparent, and wherein the reflective regions provided for the first concave portion and the reflective regions provided for the second concave portion are arranged substantially continuously to each other so that when the reflective regions provided for the first concave portion are used as concave reflective regions, the reflective regions provided for the second concave portion are used as convex reflective regions.

20. The method of claim 18, further comprising the steps of:

filling the triangular pyramidal first concave portion of the first member with a convex member having a triangular pyramidal shape corresponding to that of the first concave portion before the step c) is performed; and securing the convex member in the triangular pyramidal shape onto on the second member after the step c) has been performed.

21. The method of claim 18, wherein the first and second members are respectively extended along a common plane, the first and second concave portions have first and second reflective regions respectively, and the first and second reflective regions do not overlap each other as viewed in a normal direction to the common plane.

22. The method of claim 18, wherein each of the cubic corner cubes has three substantially square planes that are opposed almost perpendicularly to each other, and each of the square planes is defined by one of the triangular facets of the first concave portion and one of the triangular facets of the second concave portion.

23. The method of claim 18, further comprising providing a liquid crystal layer located between the first and second members.

24. The method of claim 18, wherein the first member includes at least one first flat portion formed therein and the second member includes at least one second flat portion formed therein, and where the step c) includes allowing the first concave portion to face the second flat portion and allowing the second concave portion to face the first flat portion.

25. An optical element comprising:

a first member, which has a first surface including a first concave portion, the first concave portion having a first reflective region formed thereon;

a second member, which has a second surface including a second concave portion and which transmits incoming light therethrough, the second concave portion having a second reflective region formed thereon;

wherein the first and second members are respectively extended along a common plane and disposed in such a manner that the first and second surfaces are opposed to each other and that the first and second reflective regions do not overlap each other as viewed in a normal direction to the common plane; and wherein at least part of the incoming light that has been transmitted through the second member is reflected from at least one of the first and second reflective regions.

* * * * *